United States Patent [19]

Ohtake

[11] Patent Number: 5,835,287

[45] Date of Patent: Nov. 10, 1998

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 713,857

[22] Filed: Sep. 12, 1996

[30] Foreign Application Priority Data

Nov. 24, 1995 [JP] Japan .................................. 7-329865

[51] Int. Cl.$^6$ ................................ G02B 9/58; G02B 9/34
[52] U.S. Cl. ............................................ 359/782; 359/781
[58] Field of Search .................................. 359/686, 689,
359/691, 694, 695, 747, 748, 753, 771,
776, 778, 781, 782, 784, 793

[56] References Cited

U.S. PATENT DOCUMENTS

| | | | |
|---|---|---|---|
| 4,787,718 | 11/1988 | Cho | 359/686 |
| 4,856,880 | 8/1989 | Ohshita | 359/753 |
| 5,111,338 | 5/1992 | Nakayama | 359/686 |
| 5,270,865 | 12/1993 | Kikuchi et al. | 359/686 |
| 5,283,693 | 2/1994 | Kohno et al. | 359/691 |
| 5,381,269 | 1/1995 | Estelle | 359/691 |
| 5,406,416 | 4/1995 | Ohtake | 359/686 |
| 5,483,380 | 1/1996 | Nozawa | 359/686 |
| 5,519,540 | 5/1996 | Suzuki | 359/771 |
| 5,523,888 | 6/1996 | Nishio | 359/686 |

*Primary Examiner*—Frank G. Font
*Assistant Examiner*—Michael P. Stafira
*Attorney, Agent, or Firm*—Shapiro and Shapiro

[57] ABSTRACT

A variable focal length optical system includes, in succession from an object side, a first lens component, a second lens component, a third lens component, and a fourth lens component, wherein at least two air gaps of a first air gap between the first lens component and the second lens component, a second air gap between the second lens component and the third lens component, and a third air gap between the third lens component and the fourth lens component change when the focal length of the zoom lens is changed.

12 Claims, 22 Drawing Sheets

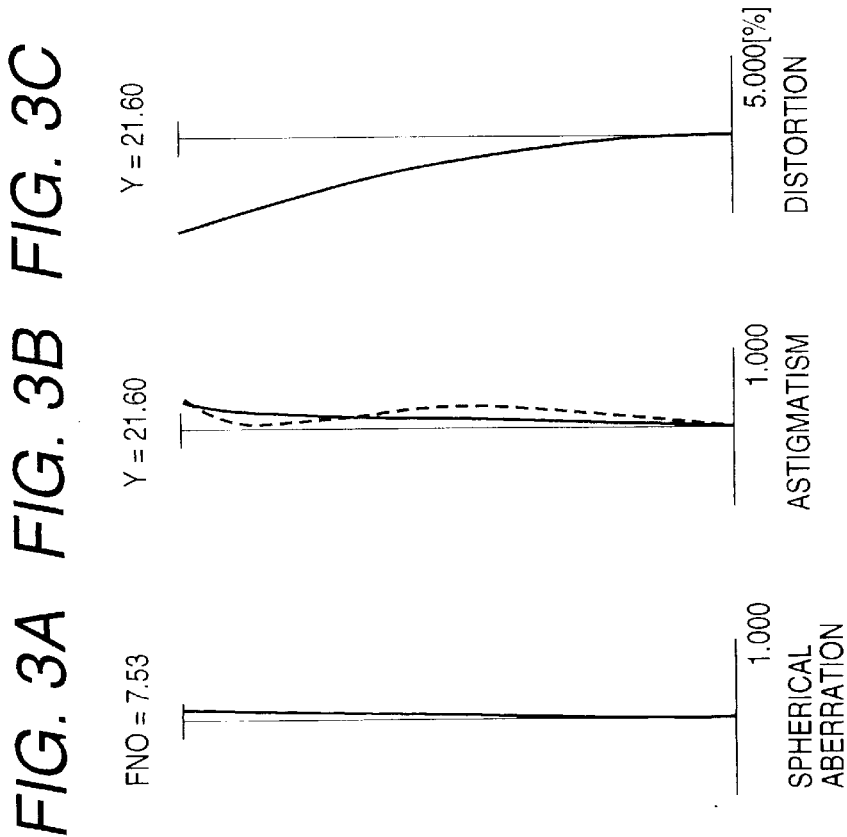

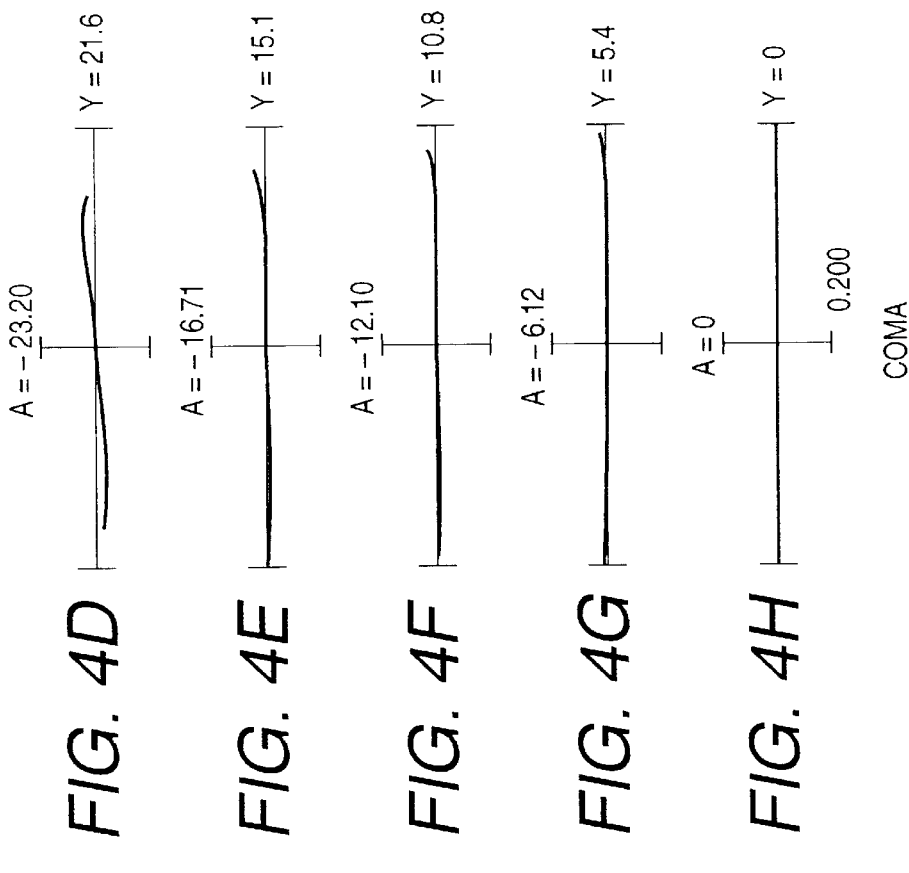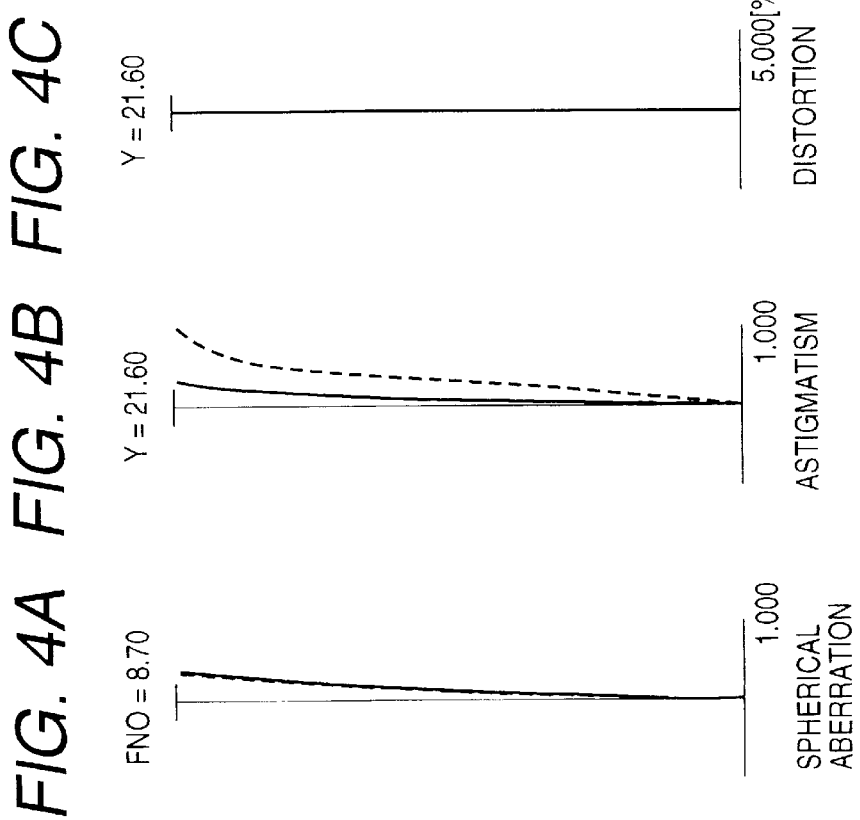

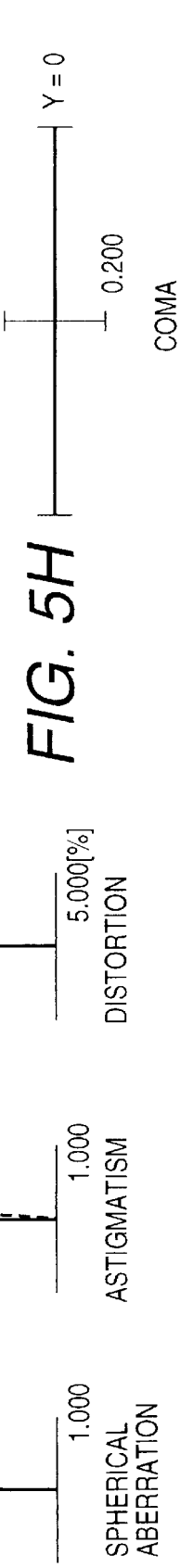

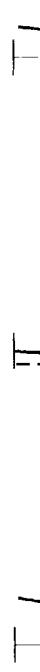

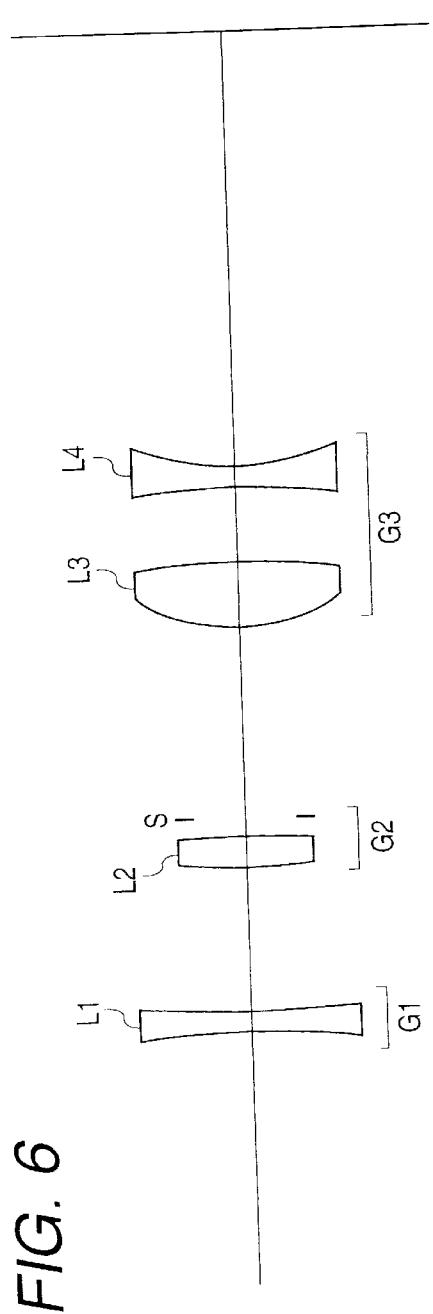
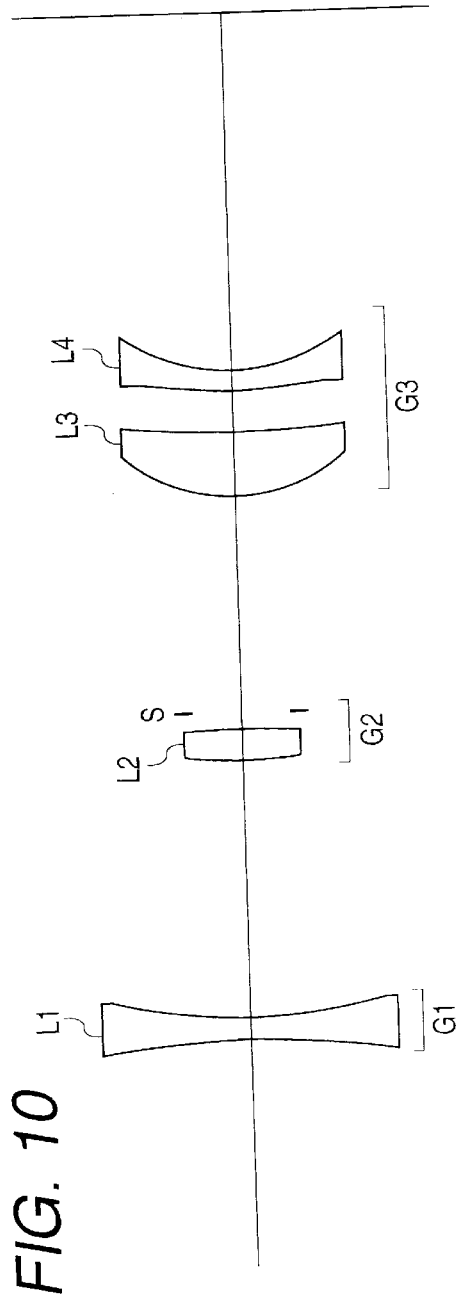

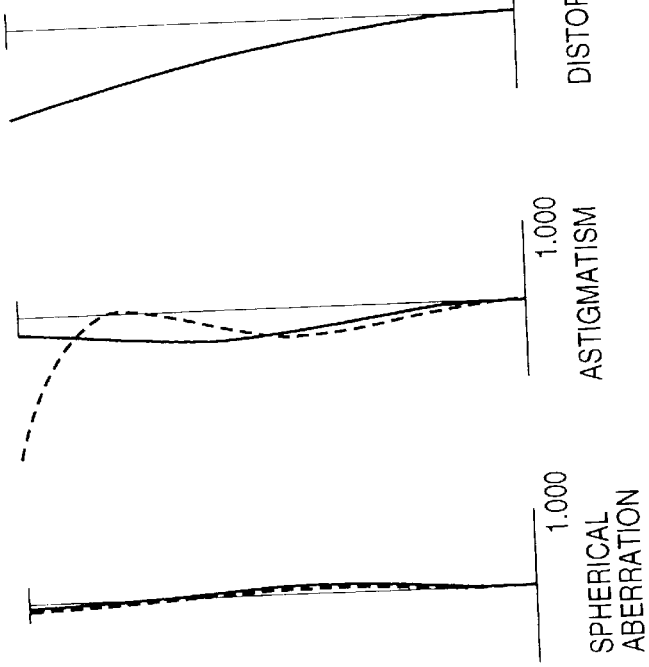
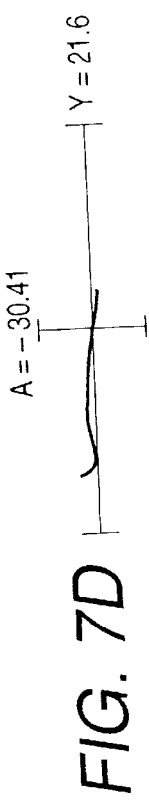
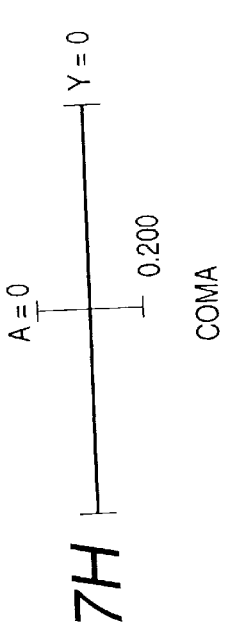

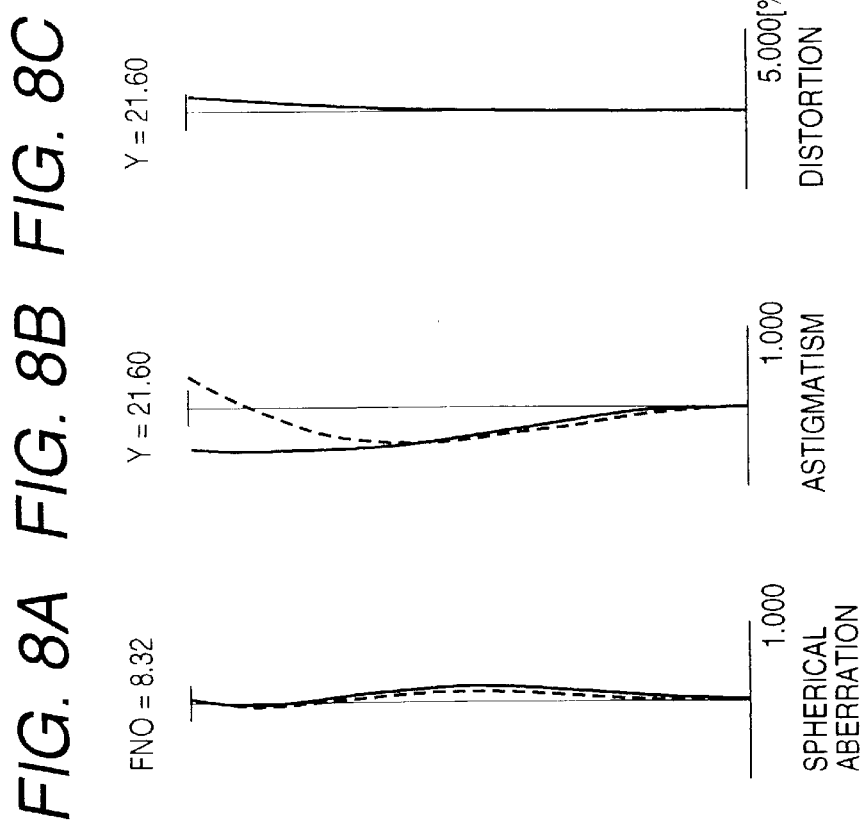

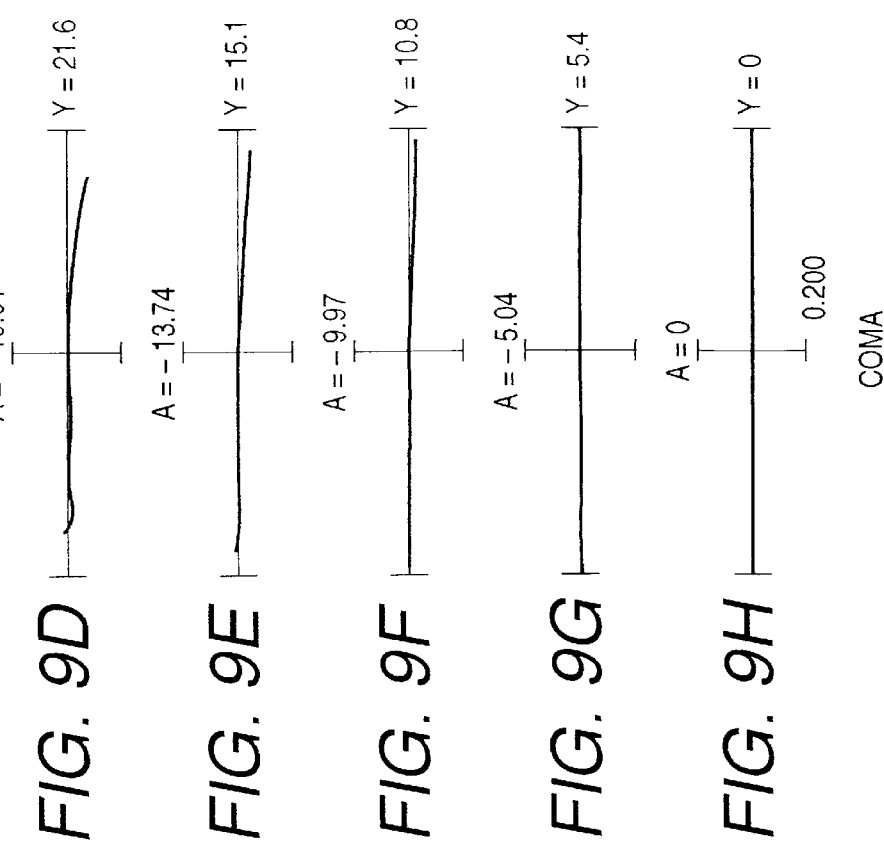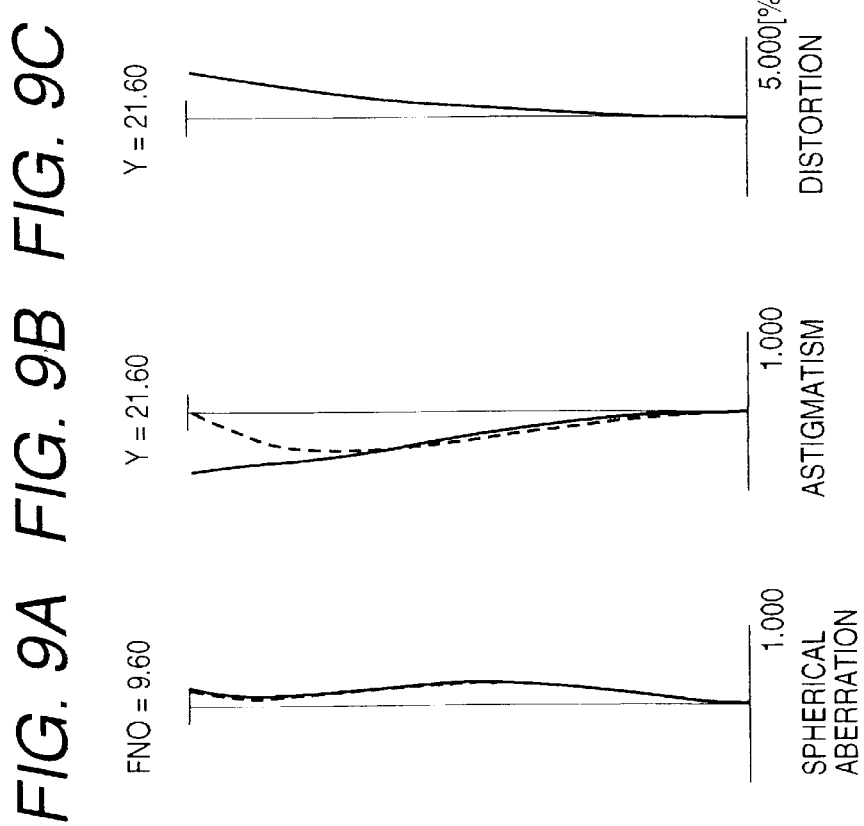

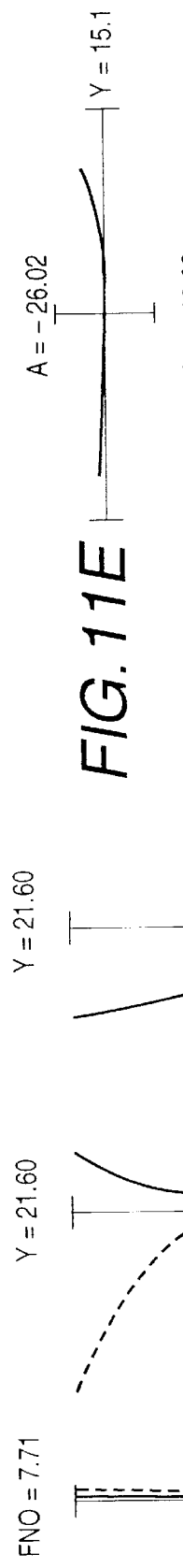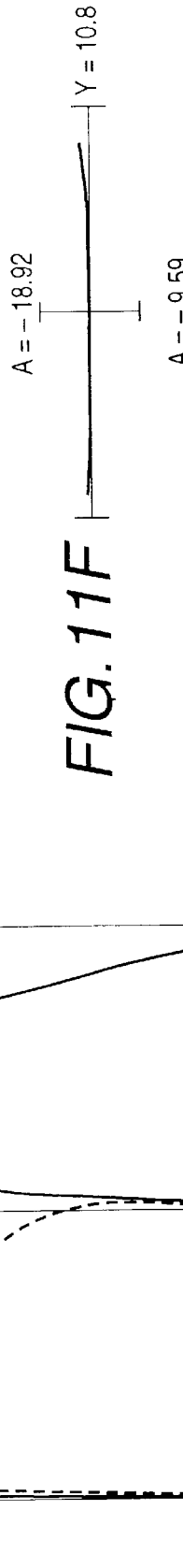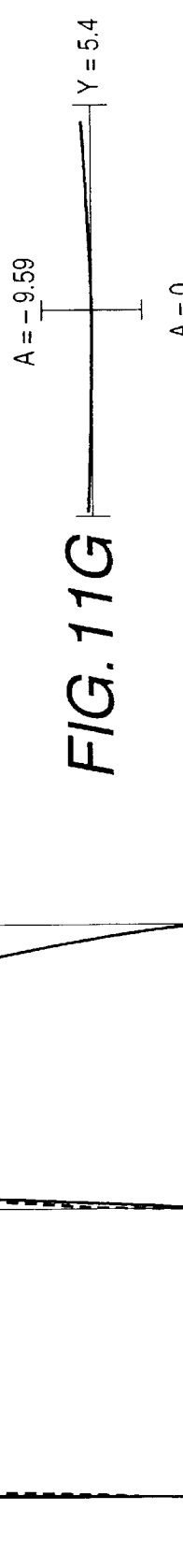
FIG.11A  FIG.11B  FIG.11C  FIG.11D  FIG.11E  FIG.11F  FIG.11G  FIG.11H

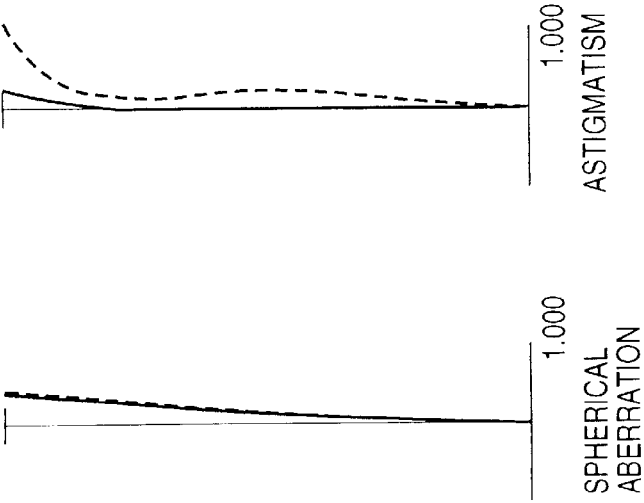

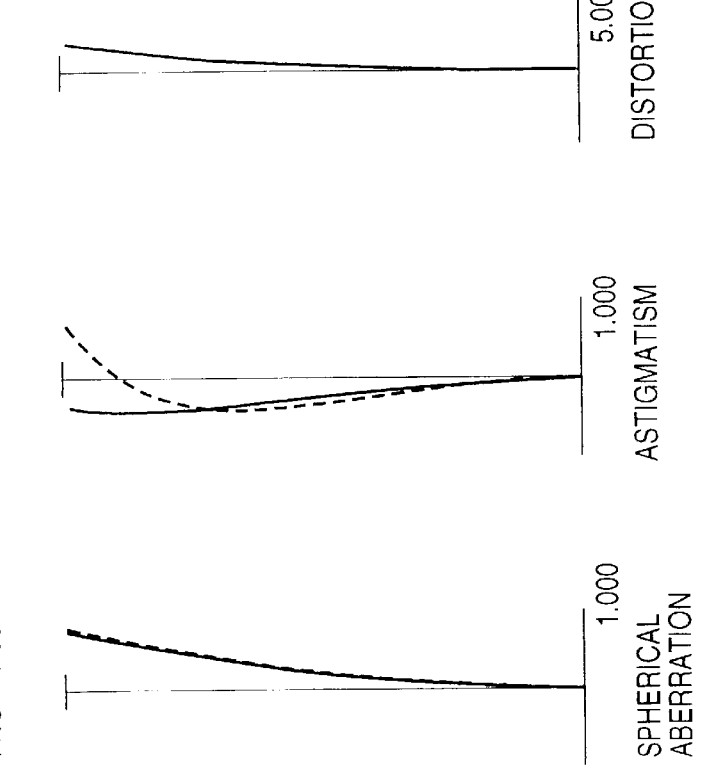
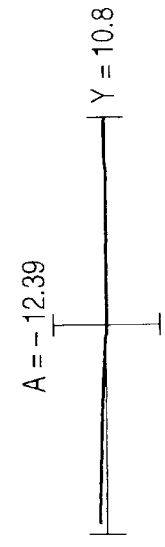
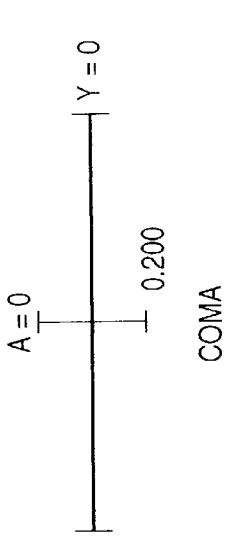
FIG. 13A  FIG. 13B  FIG. 13C  FIG. 13D  FIG. 13E  FIG. 13F  FIG. 13G  FIG. 13H

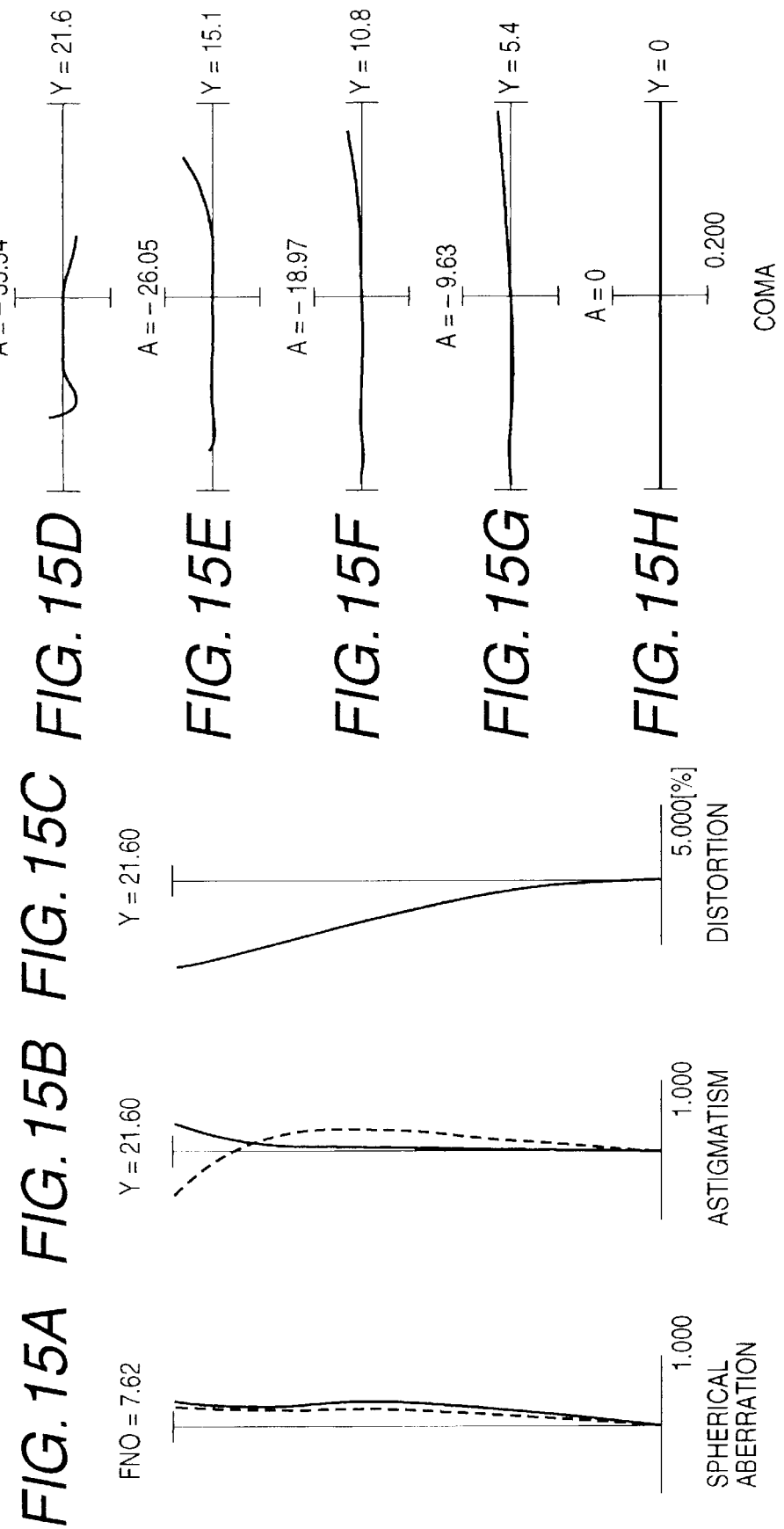

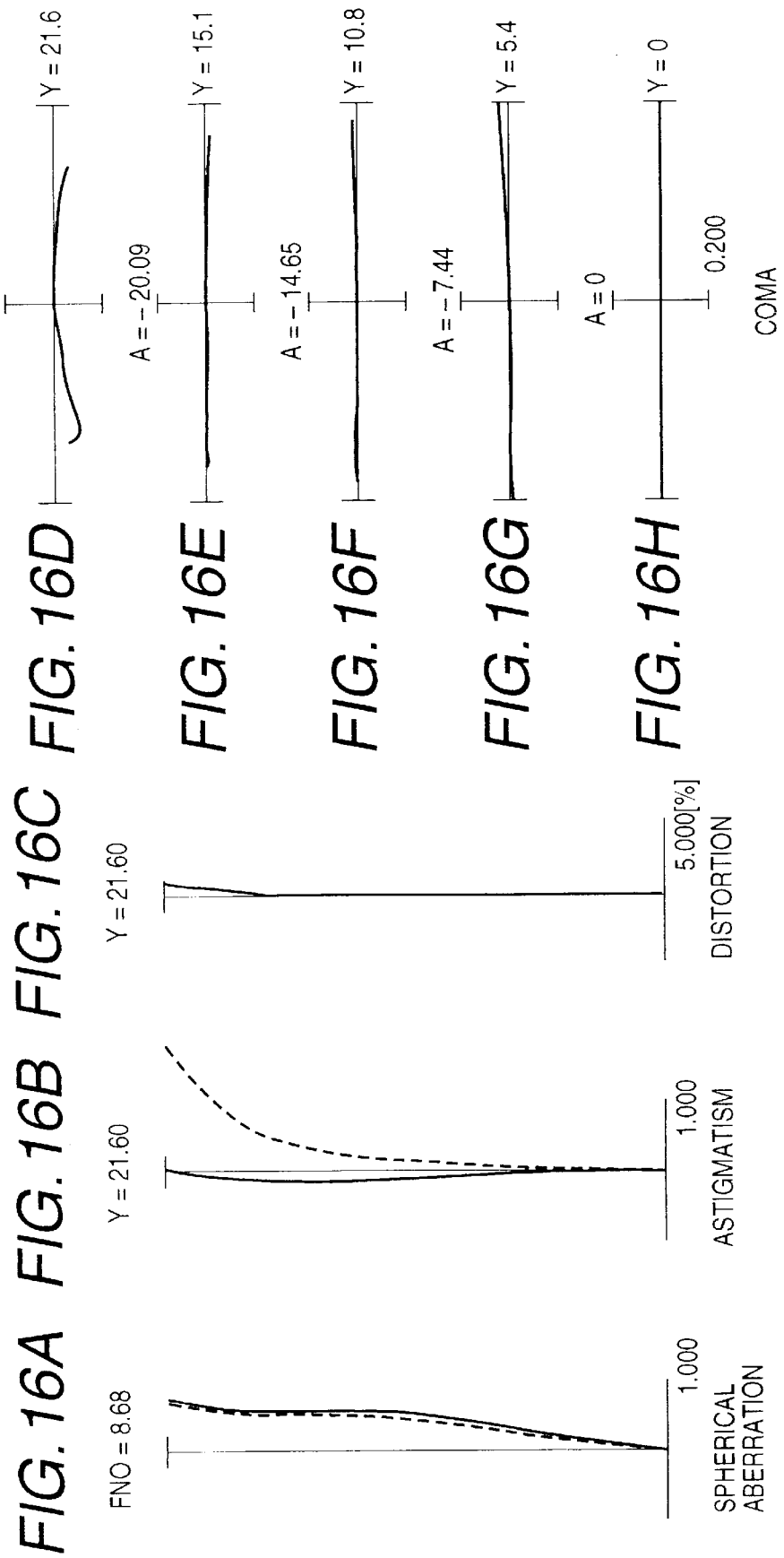

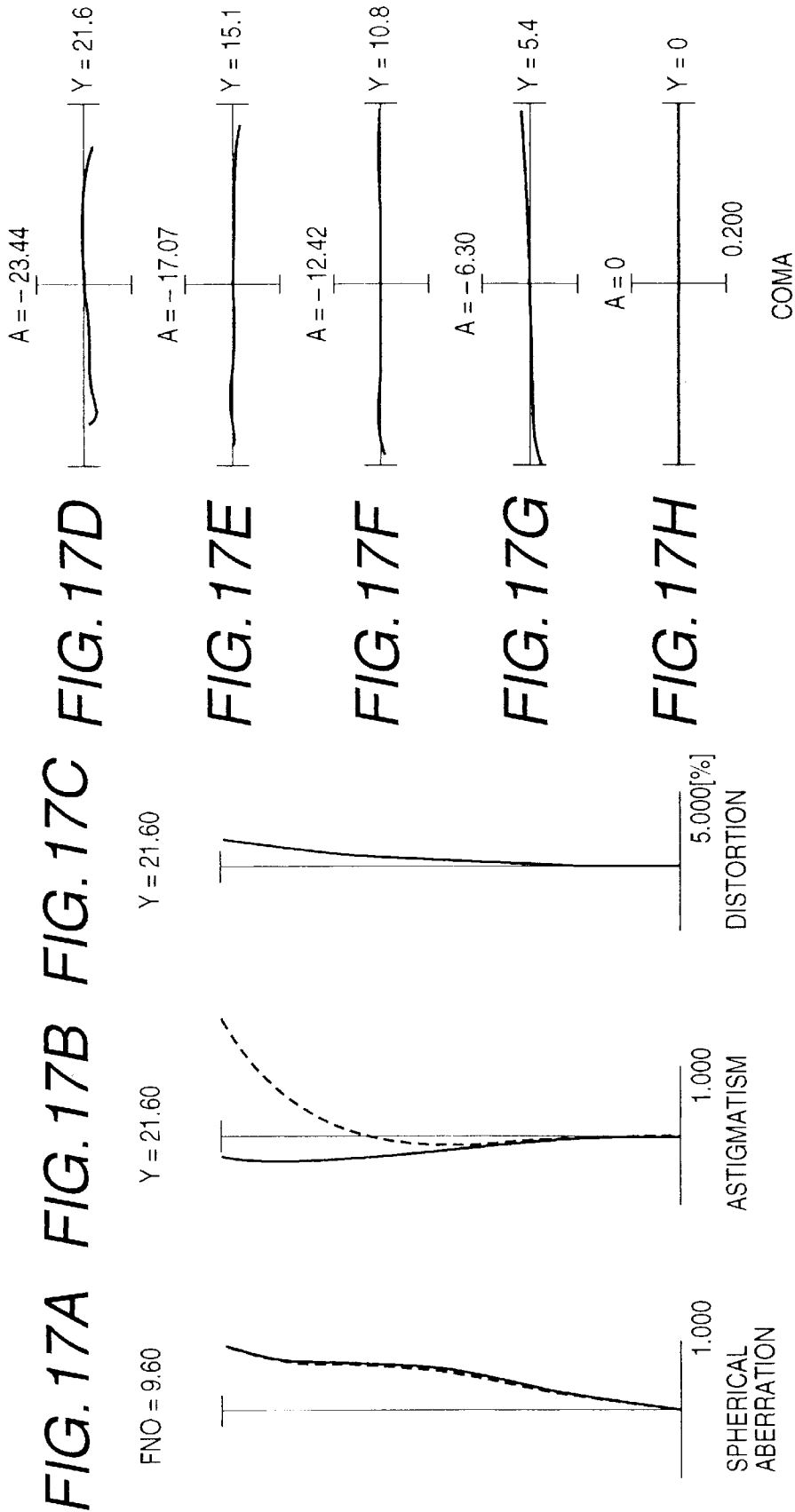

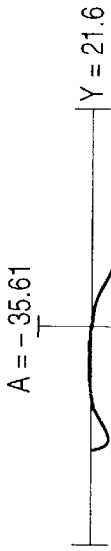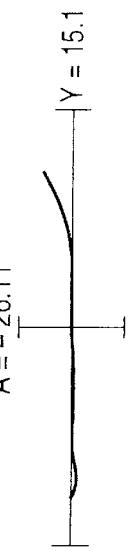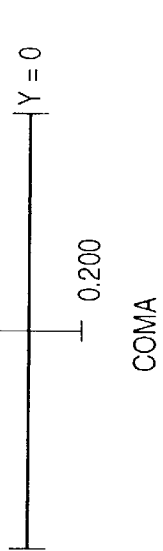

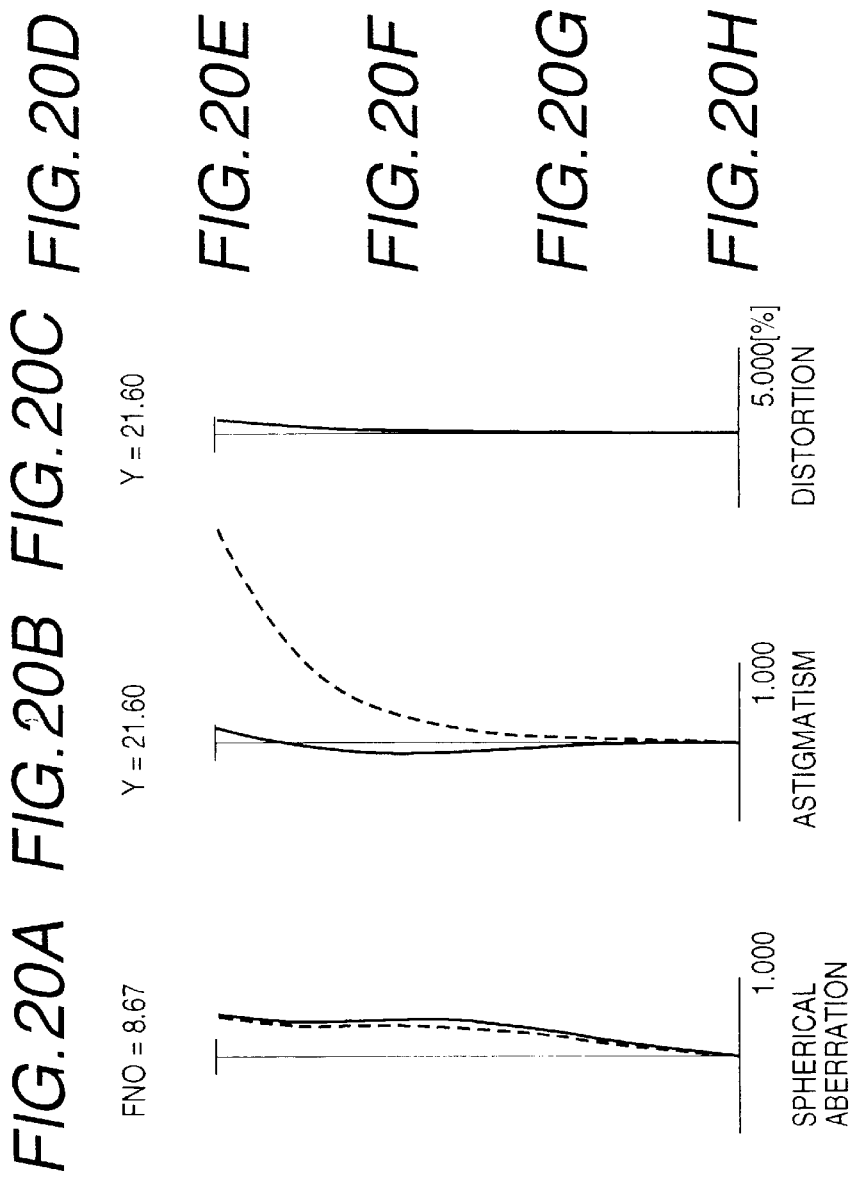

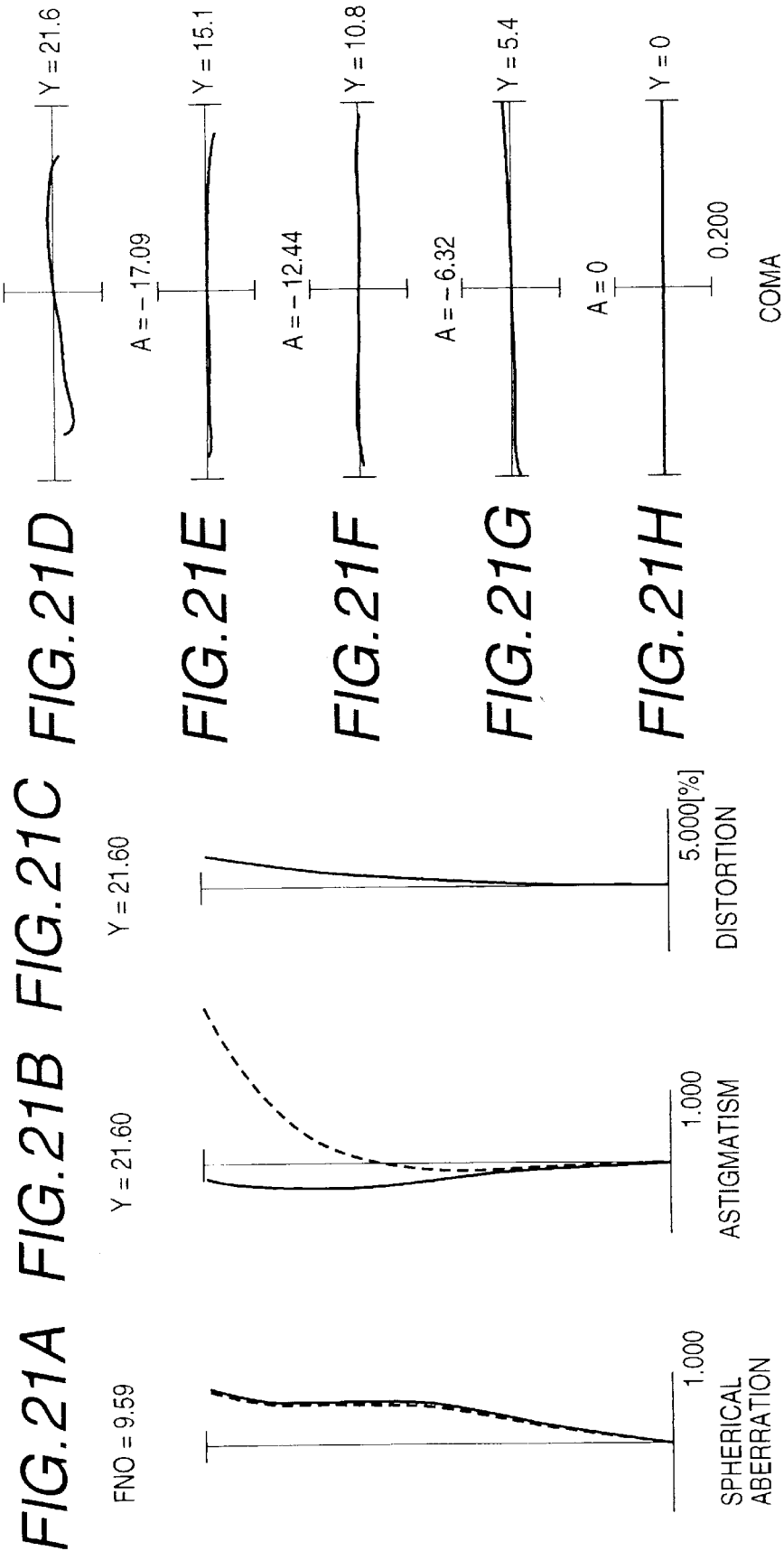

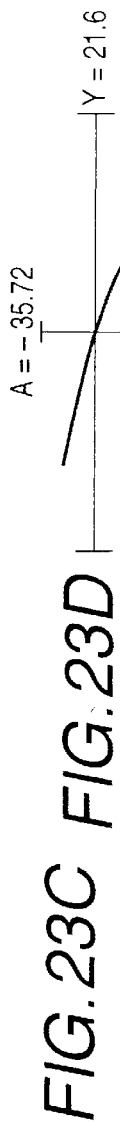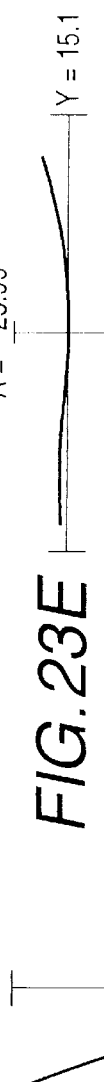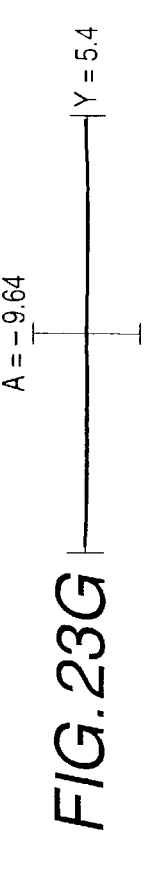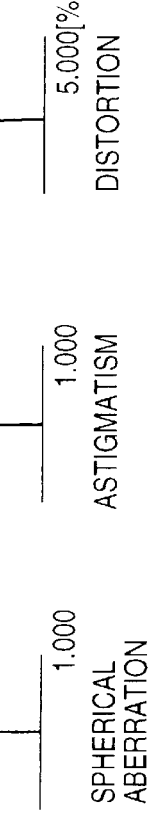

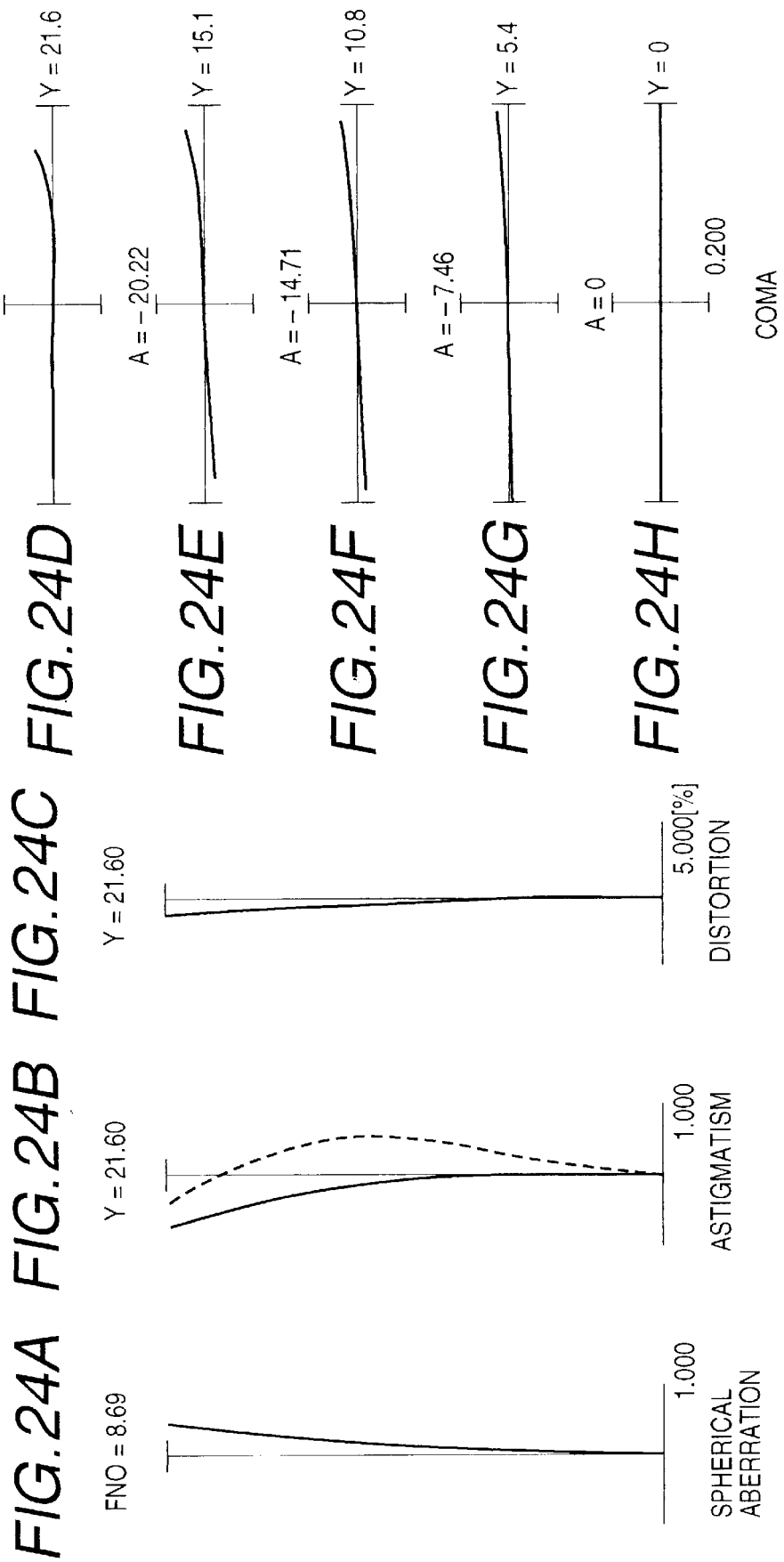

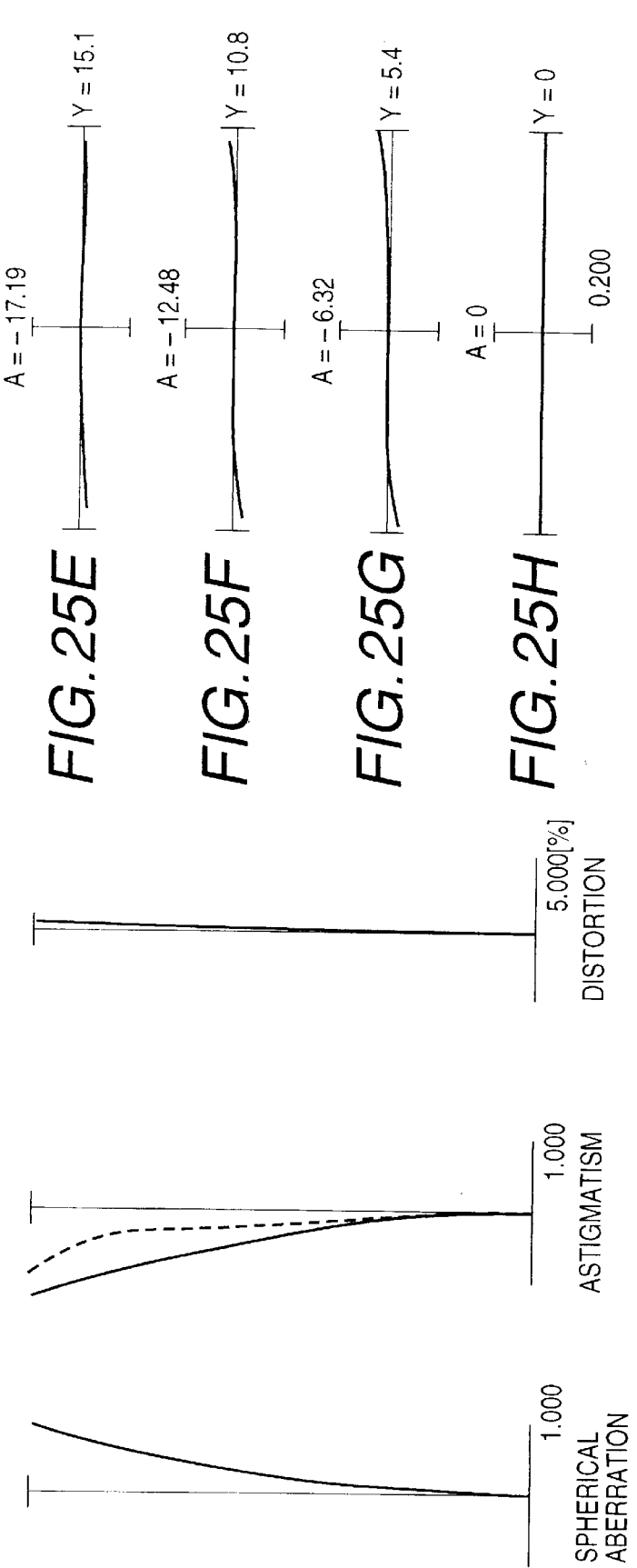

VARIABLE FOCAL LENGTH OPTICAL SYSTEM

BACKGROUNDS OF THE INVENTION

1. Field of the Invention

The present invention relates to a variable focal length optical system and, more particularly, to a compact variable focal length optical system suitable for a lens shutter type camera.

2. Related Background Art

Recently, zoom lenses are popularly used as taking lenses for lens shutter type cameras.

A lens shutter type camera has no limitation on the back focus. For this reason, a negative lens unit is arranged to be closest to the image side such that the back focus becomes small in a maximum wide-angle state. With this arrangement, the height of an off-axis light flux passing through the negative lens unit in a zooming operation is largely changed to reduce the lens diameter, and at the same time, a variation in off-axis aberration caused by the zooming operation is suppressed.

In addition, the lens shutter type camera employs an accommodation technique called a collapsible barrel method, thereby achieving size reduction of the camera body. With this accommodation technique, i.e., the collapsible barrel method, the lens units are accommodated such that the air gaps between the lens units, which are changeable in the zooming operation, are minimized in the zooming operation.

As described above, in the objective lens (zoom lens) used for the conventional lens shutter type camera, the negative lens unit is arranged to be closest to the image side so that the image formed by all lens units arranged on the object side of the negative lens unit is enlarged by the negative lens unit. Particularly, the lateral magnification of the negative lens unit is always larger than 1 in the entire zooming range. And the lateral magnification of the negative lens unit becomes larger in the positive direction in the zooming operation from the maximum wide-angle state to the maximum telephoto state. For this reason, the total lens length (distance between the frontmost surface and the image plane) largely changes in the zooming operation from the maximum wide-angle state to the maximum telephoto state.

Additionally, as for the collapsible barrel type camera, the thickness of the camera body can be reduced not by reducing the total lens length of the taking lens but by reducing the total lens thickness (the length along the optical axis from the surface closest to the object to the surface closest to the image) when the lens barrel is collapsed.

As described above, the lens shutter type camera employs the collapsible barrel method. When the total lens length largely changes in the zooming operation from the maximum wide-angle state to the maximum telephoto state, the length of the lens largely changes accordingly. Therefore, even when the total lens thickness is reduced, the thickness of the camera body can hardly be reduced.

SUMMARY OF THE INVENTION

The present invention has been made in consideration of the above problem, and has as an object to provide a variable focal length optical system whose change in total lens length in an operation for changing the state of lens positions is small.

In order to solve the above problem, according to the first aspect of the present invention, there is provided a variable focal length optical system consisting of, in succession from an object side, a first lens component (L1), a second lens component (L2), a third lens component (L3), and a fourth lens component (L4), wherein at least two air gaps of a first air gap between the first lens component (L1) and the second lens component (L2), a second air gap between the second lens component (L2) and the third lens component (L3), and a third air gap between the third lens component (L3) and the fourth lens component (L4) change when the focal length of the zoom lens is changed.

In the first aspect, preferably, the first lens component (L1) has a negative refractive power, the second lens component (L2) has a positive refractive power, the third lens component (L3) has a positive refractive power, the fourth lens component (L4) has a negative refractive power, and the third lens component (L3) and the fourth lens component (L4) integrally move when the focal length of the zoom lens is changed.

According to the second aspect of the present invention, there is provided a variable focal length optical system consisting of a positive lens unit arranged to be closest to an image, wherein the positive lens unit has a positive partial lens unit having a positive refractive power and a negative partial lens unit having a negative refractive power and arranged on the image side of the positive partial lens unit, and a lateral magnification ($\beta a$) of the positive lens unit in a maximum wide-angle state satisfies the following condition:

$$-1.5 < \beta a < 0.5.$$

In the second aspect, the positive partial lens unit consists of a positive lens (L3), and the negative partial lens unit consists of a negative lens (L4). In this case, preferably, the variable focal length optical system further comprises a negative lens unit arranged to be closest to an object, and the following condition is satisfied:

$$1.1 < \phi b / |\phi c| < 1.9$$

where $\phi b$ is the refractive power of the positive lens (L3), and $\phi c$ is the refractive power of the negative lens (L4).

According to the third aspect of the present invention, there is provided a variable focal length optical system consisting of a positive lens unit arranged to be closest to an image, wherein the positive lens unit has a positive partial lens unit having a positive refractive power and a negative partial lens unit having a negative refractive power and arranged on the image side of the positive partial lens unit, the positive partial lens unit consists of a positive lens (L3), and the negative lens portion unit consists of a negative lens (L4).

In the third aspect, preferably, the variable focal length optical system further comprises a negative lens unit arranged to be closest to an object, and the following condition is satisfied:

$$1.1 < \phi b / |\phi c| < 1.9$$

where $\phi b$ is the refractive power of the positive lens (L3), and $\phi c$ is the refractive power of the negative lens (L4).

According to the fourth aspect of the present invention, there is provided a variable focal length optical system consisting of, in succession from an object side, a first lens unit (G1) having a negative refractive power, a second lens unit (G2) having a positive refractive power, and a third lens unit (G3) having a positive refractive power, wherein the third lens unit (G3) has a positive partial lens unit having a positive refractive power and a negative partial lens unit having a negative refractive power and arranged on an image side of the positive partial lens unit, and the following condition is satisfied:

$$0.03 < DPN/f3 < 0.25$$

where DPN is the air gap along an optical axis between the positive partial lens unit and the negative partial lens unit, and f3 is the focal length of the third lens unit (G3).

The above and other objects, features and advantages of the present invention will be explained hereinafter and may be better understood by reference to the drawings and the descriptive matter which follows.

BRIEF DESCRIPTION OF THE DRAWINGS

FIGS. 3A to 3H are graphs showing various aberrations in a maximum wide-angle state in an infinite focus state of the first embodiment;

FIGS. 4A to 4H are graphs showing various aberrations in an intermediate focal length state in the infinite focus state of the first embodiment;

FIGS. 5A to 5H are graphs showing various aberrations in a maximum telephoto state in the infinite focus state of the first embodiment;

FIG. 6 is a schematic view showing the lens arrangement of a variable focal length optical system according to the second embodiment of the present invention;

FIGS. 7A to 7H are graphs showing various aberrations in a maximum wide-angle state in an infinite focus state of the second embodiment;

FIGS. 8A to 8H are graphs showing various aberrations in an intermediate focal length state in the infinite focus state of the second embodiment;

FIGS. 9A to 9H are graphs showing various aberration in a maximum telephoto state in the infinite focus state of the second embodiment;

FIG. 10 is a schematic view showing the lens arrangement of a variable focal length optical system according to the third embodiment of the present invention;

FIGS. 11A to 11H are graphs showing various aberrations in a maximum wide-angle state in an infinite focus state of the third embodiment;

FIGS. 12A to 12H are graphs showing various aberrations in an intermediate focal length state in the infinite focus state of the third embodiment;

FIGS. 13A to 13H are graphs showing various aberrations in maximum telephoto state in the infinite focus state of the third embodiment;

FIGS. 15A to 15H are graphs showing various aberrations in a maximum wide-angle state in an infinite focus state of the fourth embodiment;

FIGS. 16A to 16H are graphs showing various aberrations in an intermediate focal length state in the infinite focus state of the fourth embodiment;

FIGS. 17A to 17H are graphs showing various aberration in a maximum telephoto state in the infinite focus state of the fourth embodiment;

FIGS. 19A to 19H are graphs showing various aberrations in a maximum wide-angle state in an infinite focus state of the fifth embodiment;

FIGS. 20A to 20H are graphs showing various aberrations an intermediate focal length state in the infinite focus state the fifth embodiment;

FIGS. 21A to 21H are graphs showing various aberration in a maximum telephoto state in the infinite focus state of the fifth embodiment;

FIGS. 23A to 23H are graphs showing various aberrations in a maximum wide-angle state in an infinite focus state of the sixth embodiment;

FIGS. 24A to 24H are graphs showing various aberrations in an intermediate focal length state in the infinite focus state of the sixth embodiment; and FIGS. 25A to 25H are graphs showing various aberrations a maximum telephoto state in the infinite focus state of the sixth embodiment.

DETAILED DESCRIPTION OF THE PREFERRED EMBODIMENTS

Figure 1:
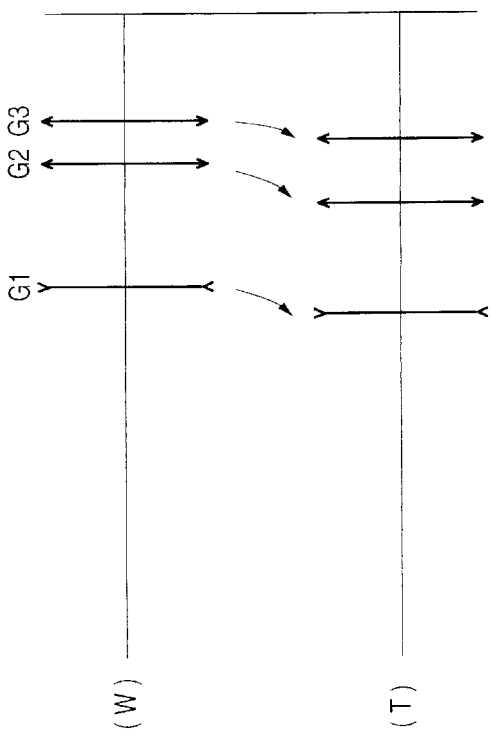
FIG. 1 is a view showing the refractive power arrangement of a variable focal length optical system according to a plurality of embodiment of the present invention and the movement of each lens unit in an operation for changing the state of lens positions from a maximum wide-angle state (W) to a maximum telephoto state (T)

The characteristic features of the arrangement of a variable focal length optical system according to the present invention will be described below.

As described above, when a negative lens unit is arranged to be closest to the image side, the total lens length in a maximum wide-angle state (smallest focal length state) largely differs from that in a maximum telephoto state (largest focal length state). To the contrary, when a positive lens unit is arranged to be closest to the image side, the change in total lens length caused by the operation for changing the state of the lens positions is small, as in a positive/negative/positive/positive type zoom lens used for, e.g., an SLR camera. However, the back focus becomes large, resulting in an increase in total lens length.

In the present invention, a positive lens unit is arranged to be closest to the image, and the positive lens unit is constituted by a positive partial lens unit and a negative partial lens unit arranged on the image side of the positive partial lens unit. With this arrangement, the back focus is reduced, so that both reduction of the total lens length and a decrease in change in total lens length can be achieved.

The market demands compact, lightweight lens shutter type cameras. A lens system used for the lens shutter type camera is also required to be compact and lightweight.

An important challenge for reducing the weight of the lens system is reduction of the number of lenses constituting the lens system. When the number of movable lenses constituting the lens system increases, control of the lens positions is difficult to result in a complex lens barrel structure. As a result, a lightweight structure cannot be obtained. Therefore, the number of movable lenses cannot be extremely increased.

The Petzval sum is known as a criterion for correcting a curvature of field in aberration correction. The Petzval sum is the sum of values obtained by dividing the refractive powers of the respective lens surfaces by their refractive indices. When the Petzval sum becomes large in the positive direction, a negative curvature of field tends to be generated. When the Petzval sum becomes large in the negative direction, a positive curvature of field tends to be generated. The Petzval sum is also used as a criterion for determining the refractive power arrangement of the lens units constituting the zoom lens. When the sum value of the refractive powers of the lens units is extremely separated from 0, the curvature of field can hardly be corrected.

When the refractive power of each lens unit strengthens, the number of lenses necessary for constituting one lens unit increases. Therefore, in the present invention, a positive lens unit and a negative lens unit are arranged on the object side of the positive lens unit arranged in the lens system to be closest to the image.

When the focal length in the maximum wide-angle state is large, the positive lens unit is arranged on the object side, and the negative lens unit is arranged on the image side. With this arrangement, the distance between the positive lens unit and the negative lens unit in the maximum telephoto state is made larger than that in the maximum wide-angle state, thereby reducing the total lens length.

To the contrary, when the focal length in the maximum wide-angle state is small, the negative lens unit is arranged on the object side and the positive lens unit is arranged on the image side. The distance between the positive lens unit and the negative lens unit in the maximum telephoto state is made smaller than that in the maximum wide-angle state. With this arrangement, the off-axis light flux passing through each lens unit in the maximum wide-angle state approaches the optical axis, so that the lens diameter can be reduced.

A stop is preferably arranged in the vicinity of the center of the lens system. More specifically, the stop is preferably arranged on the image side of the lens which is arranged to be closest to the image, and on the object side of the lens which is arranged to be closet to the object.

Particularly, in the variable focal length optical system used for the conventional lens shutter type camera, the stop also serves as a shutter. Therefore, the shutter mechanism is arranged in the lens system and moves integrally with movable lens units in the operation for changing the state of lens positions.

In the present invention, the change in total lens length in the operation for changing the state of lens positions is relatively small. Therefore, the shutter mechanism can be fixed when the focal length of the lens system is to change. In addition, the lens barrel structure can be simplified.

The stop can be moved integrally with some lens units, or some lens units can be fixed together with the shutter mechanism when the focal length of the lens system is to change.

As described above, in the present invention, the variable focal length optical system consists of three lens units, i.e., in succession from the object side, a first lens unit, a second lens unit, and a third lens unit. The first lens unit and the second lens unit have refractive powers with opposite signs. The third lens unit has a positive refractive power. When the focal length of the entire lens system is to change (zooming), at least two lens units are moved such that the air gaps formed between two lens units adjacent to each other change. With this arrangement, the refractive power of each lens unit can be weakened. As a result, the number of lenses constituting each lens unit can be decreased, so that a lightweight structure can be achieved.

In the present invention, the refractive power of each lens unit is weakened. With this arrangement, the number of lenses constituting the lens system can be decreased. More specifically, the first lens unit or the second lens unit can be constituted by one lens. Particularly, when an aspherical surface is inserted, the diameter can be increased, or high performance can be achieved. When a glass member having a high refractive index is used, a larger field angle can be obtained.

In addition, in the present invention, some of the lenses constituting the lens system can be formed as plastic lenses.

A plastic material is lighter in weight than a glass material. In addition, the plastic material can be molded at a low temperature and is excellent in workability. For this reason, some lenses are preferably formed as plastic lenses. However, a plastic material tends to be adversely affected by a change in environment such as the temperature or humidity and easily causes a change in refractive index. Therefore, in the present invention, a plurality of plastic lenses are arranged, and the sum of the refractive indices of the plastic lenses is set to be almost zero, thereby preventing the performance from being easily changed by a change in environment.

According to the preferred embodiments of the present invention, both a lightweight structure and high performance can be easily achieved by inserting an aspherical plastic lens.

As described above, preferably, the third lens unit is constituted by the positive partial lens unit arranged on the object side and the negative partial lens unit arranged on the image side of the positive partial lens unit, each partial lens unit is constituted by at least one lens, and the third lens unit is constituted by at least two lenses.

Particularly, when the air gap between the positive partial lens unit and the negative partial lens unit is set at an appropriate value, a compact, lightweight structure can be obtained.

In the present invention, to reduce the total lens length in the maximum telephoto state and satisfactorily correct the off-axis aberration in the maximum wide-angle state, it is preferable to move the first lens unit to the image side in the operation for changing the state of lens positions from the maximum wide-angle state to the maximum telephoto state. In addition, to simplify the lens barrel structure, the second lens unit is preferably fixed along the optical axis in the operation for changing the state of lens positions.

The conditional formulas of the present invention will be described below.

In the present invention, a lateral magnification $\beta a$ of the positive lens unit arranged to be closest to the image satisfies conditional formula (1) in the maximum wide-angle state:

$$-1.5 < \beta a < 0.5 \qquad (1)$$

When $\beta a$ of conditional formula (1) exceeds the upper limit value, the synthesized refractive power of all the lens units arranged on the object side of the positive lens unit is strengthened in the positive direction, so that the total lens length is reduced. However, (i) the refractive power of the positive lens unit is extremely weakened in the positive direction, or (ii) the back focus is extremely decreased.

When (i), i.e., the refractive power of the positive lens unit is extremely weakened in the positive direction, the positive lens unit rarely contributes to the operation for changing the state of lens positions, resulting in a difficulty in simplifying the structure of the lens system.

When (ii), i.e., the back focus is extremely decreased, the off-axis light flux passing through the positive lens unit is extremely separated from the optical axis. Therefore, the lens diameter cannot be reduced.

To the contrary, when βa is smaller than the lower limit value, the back focus becomes too large, and the total lens length becomes too large accordingly.

In the present invention, preferably, the positive lens unit arranged to closest to the image has a positive partial lens unit (positive lens L3) and a negative partial lens unit (negative lens L4) arranged on the image side of the positive partial lens unit, and conditional formula (2) is satisfied:

$$1.1 < \phi b/|\phi c| < 1.9 \quad (2)$$

where

φb: the refractive power of the positive partial lens unit (positive lens L3)

φc: the refractive power of the negative partial lens unit (negative lens L4)

Conditional formula (2) defines the ratio of the refractive power of the positive partial lens unit to that of the negative partial lens unit, which lens units constitute the positive lens unit arranged in the lens system to be closest to the image.

When φb/|φc| of conditional formula (2) exceeds the upper limit value, the converging action of the positive partial lens unit is increased. Therefore, the negative spherical aberration generated in the positive partial lens unit cannot be satisfactorily corrected.

To the contrary, when φb/|φc| of conditional formula (2) is smaller than the lower limit value, the diverging action of the negative partial lens unit is increased. As a result, the off-axis light flux passing through the negative partial lens unit approaches the optical axis. Therefore, the on-axis aberration and the off-axis aberration can hardly be simultaneously corrected, and the coma by the field angle undesirably varies.

In the present invention, the variable focal length optical system consists of, in succession from the object side, a first lens unit G1 having a negative refractive power, a second lens unit G2 having a positive refractive power, and a third lens unit G3 having a positive refractive power, wherein the third lens unit G3 has a positive partial lens unit and a negative partial lens unit arranged on the image side of the positive partial lens unit, and conditional formula (3) is satisfied:

$$0.03 < DPN/f3 < 0.25 \quad (3)$$

where

DPN: the air gap along the optical axis between the positive partial lens unit and the negative partial lens unit f3: the focal length of the third lens unit G3 Conditional formula (3) defines the air gap along the optical axis between the positive partial lens unit and the negative partial lens unit, which lens units constitute the positive lens unit G3 arranged in the lens system to be closest to the image.

When DPN/f3 of conditional formula (3) exceeds the upper limit value, the off-axis light flux passing through the negative partial lens unit is separated from the optical axis. As a result, the lens diameter of the negative partial lens unit becomes so large that a predetermined light amount cannot be ensured.

To the contrary, when DPN/f3 is smaller than the lower limit value, the refractive powers of the positive and negative partial lens units are strengthened. Therefore, the performance is largely degraded by intereccentricity, resulting in a difficulty in manufacturing.

Each embodiment of the present invention will be described below with reference to the accompanying drawings.

FIG. 1 is a view showing the refractive power arrangement of a variable focal length optical system according to a plurality of embodiments of the present invention and movement of each lens unit in the operation for changing the state of lens positions from the maximum wide-angle state (W) to the maximum telephoto state (T).

As shown in FIG. 1, the variable focal length optical system according to a plurality of embodiments of the present invention consists of, in succession from the object side, a first lens unit G1 having a negative refractive power, a second lens unit G2 having a positive refractive power, and a third lens unit G3 having a positive refractive power. In the operation for changing the state of lens positions from the maximum wide-angle state to the maximum telephoto state, at least the third lens unit G3 moves to the object side such that the air gap between the third lens unit G3 and the second lens unit G2 is decreased while the air gap between the second lens unit G2 and the first lens unit G1 is decreased.

In each embodiment, an aspherical surface is represented by equation (a):

$$S(y)=(y^2/R)/[1+(1-K \cdot y^2/R^2)^{1/2}]+C_4 \cdot y^4+C_6 \cdot y^6+C_8 \cdot y^8+C_{10} \cdot y^{10}+ \quad (a)$$

where y is the height in a direction perpendicular to the optical axis, S(y) is the displacement amount (sag amount) along the optical axis at the height y, R is the reference radius of curvature, K is the constant of the cone, and $C_n$ is the aspherical surface coefficient of degree n.

In each embodiment, an aspherical surface is represented by adding an asterisk on the right side of the surface number.

[First Embodiment]

Figure 2:
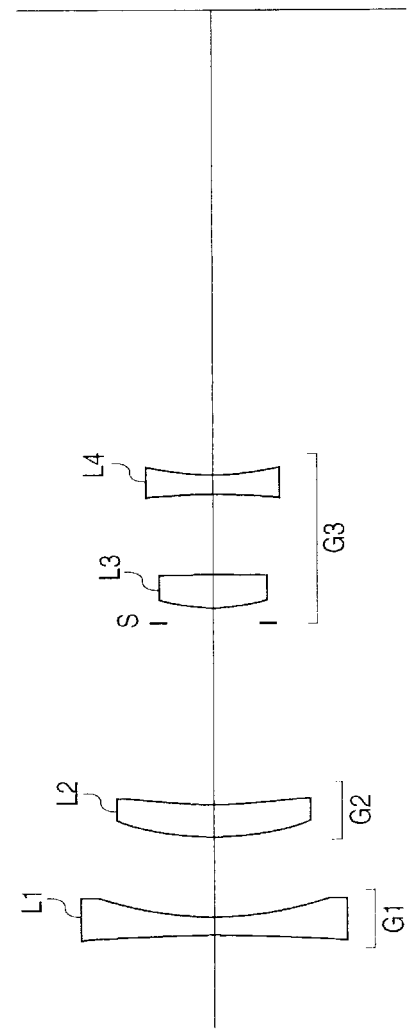
FIG. 2 is a schematic view showing the lens arrangement of a variable focal length optical system according to the first embodiment of the present invention.

FIG. 2 is a schematic view showing the lens arrangement of a variable focal length optical system according to the first embodiment of the present invention.

The variable focal length optical system shown in FIG. 2 comprises, in succession from the object side, a first lens unit G1 consisting of a biconcave lens L1, a second lens unit G2 consisting of a positive meniscus lens L2 with its convex surface facing the object side, and a third lens unit G3 consisting of a biconvex lens L3 and a biconcave lens L4.

The third lens unit G3 has the biconvex lens L3 as a positive partial lens unit and the biconcave lens L4 as a negative partial lens unit.

An aperture stop S is arranged between the second lens unit G2 and the third lens unit G3 and moves integrally with the third lens unit G3 in the operation for changing the state of lens positions from the maximum wide-angle state to the maximum telephoto state.

FIG. 2 shows the positional relationship between the lens units in the maximum wide-angle state. In the operation for changing the state of lens positions to the maximum telephoto state, the second lens unit G2 is fixed, the first lens unit G1 moves to the image side, and the third lens unit G3 moves to the object side.

Table 1 shows numerical data of the first embodiment of the present invention. In Table 1, f is the focal length, FNO is the F-number, 2ω is the field angle, and Bf is the back focus. In addition, the surface number represents the order of lens surfaces from the object side along the direction of propagation of the light beam, and the refractive index and Abbe number represent values for the d-line (λ=587.6 nm).

TABLE 1 f = 38.934 to 50.399 to 61.109
FNO = 7.5 to 8.6 to 9.6
2ω = 60.82° to 46.40° to 38.93°

| Surface number | Radius of curvature | Surface-to-surface distance | Abbe number | Refractive index |
|---|---|---|---|---|
| 1 | −112.6286 | 1.512 | 49.61 | 1.77250 |
| 2 | 31.0834 | (d2 = variable) | | |
| 3* | 23.3061 | 2.772 | 57.57 | 1.49108 (acryl) |
| 4 | 50.2256 | (d4 = variable) | | |
| 5 | ∞ | 1.260 | | (aperture stop S) |
| 6 | 14.0516 | 2.772 | 63.38 | 1.61800 |
| 7 | −162.6560 | 6.678 | | |
| 8* | −101.6122 | 1.638 | 30.24 | 1.58518 (polycarbonate) |
| 9 | 26.8793 | (Bf) | | |

(Aspherical Surface Data)
(3rd surface)

$\kappa = 1.0000$    $C_4 = -1.16658 \times 10^{-5}$
$C_6 = 5.26325 \times 10^{-9}$    $C_8 = -4.50842 \times 10^{-11}$
$C_{10} = -1.14219 \times 10^{-12}$
(8th surface)

$\kappa = 1.0000$    $C_4 = -1.61040 \times 10^{-4}$
$C_6 = 1.18909 \times 10^{-6}$    $C_8 = -1.06506 \times 10^{-7}$
$C_{10} = 1.56337 \times 10^{-9}$ (Variable Distances in Operation for Changing the State of Lens Positions)

| f | 38.934 | 50.399 | 61.109 |
|---|---|---|---|
| d2 | 6.557 | 5.346 | 5.493 |
| d4 | 15.112 | 7.807 | 1.606 |
| Bf | 40.071 | 47.375 | 53.576 |

(Condition Corresponding Values)

$1/\phi b = +21.055$
$1/\phi c = -36.154$
$f3 = +31.486$
(1) $\beta a$ = −0.711 to −1.139
(2) $\phi b/|\phi c|$ = 1.717
(3) DPN/f3 = 0.212

FIGS. 3A to 5H are graphs showing various aberrations for the d-line (λ=587.6 nm) in the first embodiment. FIGS. 3A to 3H are graphs showing various aberrations in the infinite focus state in the maximum wide-angle state (smallest focal length state). FIGS. 4A to 4H are graphs showing various aberrations in the infinite focus state in the intermediate focal length state. FIGS. 5A to 5H are graphs showing various aberrations in the infinite focus state in the maximum telephoto state (largest focal length state).

In these graphs, FNO is the F-number, Y is the image height, and A is the half field angle for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective focal length states.

[Second Embodiment]

FIG. 6 is a schematic view showing the lens arrangement of a variable focal length optical system according to the second embodiment of the present invention.

The variable focal length optical system shown in FIG. 6 comprises, in succession from the object side, a first lens unit G1 consisting of a biconcave lens L1, a second lens unit G2 consisting of a biconvex lens L2, and a third lens unit G3 consisting of a biconvex lens L3 and a biconcave lens L4.

The third lens unit G3 has the biconvex lens L3 as a positive partial lens unit and the biconcave lens L4 as a negative partial lens unit.

An aperture stop S is arranged between the second lens unit G2 and the third lens unit G3 and moves integrally with the second lens unit G2 in the operation for changing the state of lens positions from the maximum wide-angle state to the maximum telephoto state.

FIG. 6 shows the positional relationship between the lens units in the maximum wide-angle state. In the operation for changing the state of lens positions to the maximum telephoto state, the first lens unit G1 moves to the image side, the second lens unit G2 is fixed, and the third lens unit G3 moves to the object side.

Table 2 shows numerical data of the second embodiment of the present invention. In Table 2, f is the focal length, FNO is the F-number, 2ω is the field angle, and Bf is the back focus. In addition, the surface number represents the order of lens surfaces from the object side along the direction of propagation of the light beam, and the refractive index and Abbe number represent values for the d-line (λ=587.6 nm).

TABLE 2 f = 38.934 to 50.400 to 61.109
FNO = 7.1 to 8.3 to 9.6
2ω = 60.82° to 46.04° to 38.93°

| Surface number | Radius of curvature | Surface-to-surface distance | Abbe number | Refractive index |
|---|---|---|---|---|
| 1 | −38.8420 | 1.512 | 40.73 | 1.80610 |
| 2 | 81.2232 | (d2 = variable) | | |
| 3* | 44.3813 | 2.520 | 57.57 | 1.49108 (acryl) |
| 4 | −44.1559 | 1.260 | | |
| 5 | ∞ | (d5 = variable) | | (aperture stop S) |
| 6 | 14.8357 | 5.040 | 70.45 | 1.48749 |
| 7 | −88.5921 | 5.880 | | |
| 8* | −205.7817 | 1.638 | 30.24 | 1.58518 (polycarbonate) |
| 9 | 21.4132 | (Bf) | | |

(Aspherical Surface Data)
(3rd surface)

$\kappa = 1.0000$    $C_4 = -2.56342 \times 10^{-5}$
$C_6 = 2.81287 \times 10^{-6}$    $C_8 = -1.57830 \times 10^{-7}$
$C_{10} = 3.09176 \times 10^{-9}$
(8th surface)

$\kappa = 1.0000$    $C_4 = -8.42142 \times 10^{-5}$
$C_6 = -5.45375 \times 10^{-7}$    $C_8 = 1.14280 \times 10^{-10}$
$C_{10} = -9.56773 \times 10^{-12}$ (Variable Distances in Operation for Changing the State of Lens Positions)

| f | 38.934 | 50.400 | 61.109 |
|---|---|---|---|
| d2 | 11.269 | 6.921 | 4.753 |
| d5 | 14.925 | 6.792 | 0.1269 |
| Bf | 34.328 | 42.460 | 49.126 |

(Condition Corresponding Values)

$1/\phi b = +16.711$
$1/\phi c = -28.694$
$f3 = +53.627$
(1) $\beta a$ = −0.010 to −0.286

TABLE 2-continued

| | |
|---|---|
| (2) φb/\|φc\| | = 1.717 |
| (3) DPN/f3 | = 0.110 |

FIGS. 7A to 9H are graphs showing various aberrations for the d-line λ=587.6 nm) in the second embodiment. FIGS. 7A to 7H are graphs showing various aberrations in the infinite focus state in the maximum wide-angle state (smallest focal length state). FIGS. 8A to 8H are graphs showing various aberrations in the infinite focus state in the intermediate focal length state. FIGS. 9A to 9H are graphs showing various aberrations in the infinite focus state in the maximum telephoto state (largest focal length state).

In these graphs, FNO is the F-number, Y is the image height, and A is the half field angle for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective focal length states.

[Third Embodiment]

FIG. 10 is a schematic view showing the lens arrangement of a variable focal length optical system according to the third embodiment of the present invention.

The variable focal length optical system shown in FIG. 10 comprises, in succession from the object side, a first lens unit G1 consisting of a biconcave lens L1, a second lens unit G2 consisting of a biconvex lens L2, and a third lens unit G3 consisting of a positive meniscus lens L3 with its convex surface facing the object side and a negative meniscus lens L4 with its convex surface facing the object side.

The third lens unit G3 has the positive meniscus lens L3 as a positive partial lens unit and the negative meniscus lens L4 as a negative partial lens unit.

An aperture stop S is arranged between the second lens unit G2 and the third lens unit G3 and moves integrally with the second lens unit G2 in the operation for changing the state of lens positions from the maximum wide-angle state to the maximum telephoto state.

FIG. 10 shows the positional relationship between the lens units in the maximum wide-angle state. In the operation for changing the state of lens positions to the maximum telephoto state, the first lens unit G1 moves to the image side, the second lens unit G2 is fixed, and the third lens unit G3 moves to the object side.

Table 3 shows numerical data of the third embodiment of the present invention. In Table 3, f is the focal length, FNO is the F-number, 2ω is the field angle, and Bf is the back focus. In addition, the surface number represents the order of lens surfaces from the object side along the direction of propagation of the light beam, and the refractive index and Abbe number represent values for the d-line (λ=587.6 nm).

TABLE 3 f = 32.082 to 41.504 to 49.038
FNO = 7.7 to 8.6 to 9.5
2ω = 70.81° to 54.73° to 46.84°

| Surface number | Radius of curvature | Surface-to-surface distance | Abbe number | Refractive index |
|---|---|---|---|---|
| 1 | −52.3461 | 1.512 | 56.93 | 1.62280 |
| 2 | 43.0960 | (d2 = variable) | | |

TABLE 3-continued

| 3 | 34.0673 | 2.520 | 63.38 | 1.61800 |
|---|---|---|---|---|
| 4 | −95.4071 | 1.260 | | |
| 5 | ∞ | (d5 = variable) | | (aperture stop S) |
| 6 | 14.5452 | 5.040 | 70.45 | 1.48749 |
| 7 | 95.3090 | 3.390 | | |
| 8* | 35.8118 | 1.630 | 30.24 | 1.58518 (polycarbonate) |
| 9 | 14.9871 | (Bf) | | |

(Aspherical Surface Data)
(8th surface)

κ = 1.0000    $C_4 = -8.54639 \times 10^{-5}$
$C_6 = 4.11519 \times 10^{-7}$    $C_8 = -9.25743 \times 10^{-9}$
$C_{10} = 4.73695 \times 10^{-11}$ (Variable Distances in Operation for Changing the State of Lens Positions)

| f | 32.082 | 41.504 | 49.038 |
|---|---|---|---|
| d2 | 20.397 | 12.307 | 8.428 |
| d5 | 17.101 | 8.657 | 2.785 |
| Bf | 28.991 | 37.407 | 43.256 |

(Condition Corresponding Values)

1/φb = +34.505
1/φc = −45.360
f3 = +78.282
(1) βa = 0.375 to 0.192
(2) φb/\|φc\| = 1.315
(3) DPN/f3 = 0.043

FIGS. 11A to 13H are graphs showing various aberrations for the d-line (λ=587.6 nm) in the third embodiment. FIGS. 11A to 11H are graphs showing various aberrations in the infinite focus state in the maximum wide-angle state (smallest focal length state). FIGS. 12A to 12H are graphs showing various aberrations in the infinite focus state in the intermediate focal length state. FIGS. 13A to 13H are graphs showing various aberrations in the infinite focus state in the maximum telephoto state (largest focal length state).

In these graphs, FNO is the F-number, Y is the image height, and A is the half field angle for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective focal length states.

[Fourth Embodiment]

Figure 14:
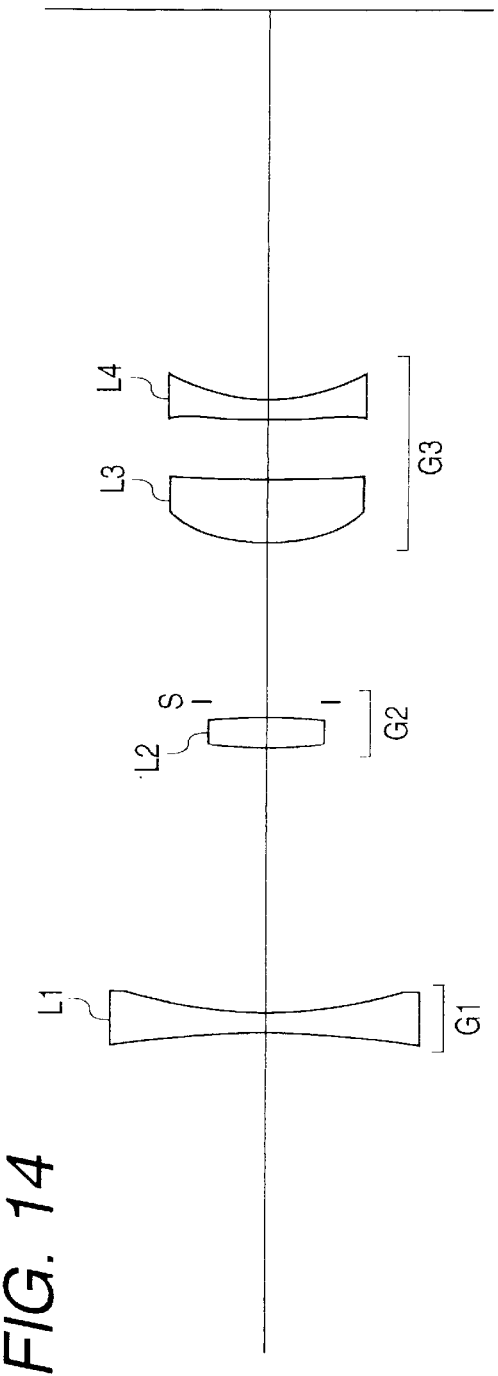
FIG. 14 schematic view showing the lens arrangement of a variable focal length optical system according to the fourth embodiment of the present invention.

FIG. 14 is a schematic view showing the lens arrangement of a variable focal length optical system according to the fourth embodiment of the present invention.

The variable focal length optical system shown in FIG. 14 comprises, in succession from the object side, a first lens unit G1 consisting of a biconcave lens L1, a second lens unit G2 consisting of a biconvex lens L2, and a third lens unit G3 consisting of a positive meniscus lens L3 with its convex surface facing the object side and a negative meniscus lens L4 with its convex surface facing the object side.

The third lens unit G3 has the positive meniscus lens L3 as a positive partial lens unit and the negative meniscus lens L4 as a negative partial lens unit.

An aperture stop S is arranged between the second lens unit G2 and the third lens unit G3 and moves integrally with the second lens unit G2 in the operation for changing the state of lens positions from the maximum wide-angle state to the maximum telephoto state.

FIG. 14 shows the positional relationship between the lens units in the maximum wide-angle state. In the operation for changing the state of lens positions to the maximum telephoto state, the first lens unit G1 moves to the image side, the second lens unit G2 is fixed, and the third lens unit G3 moves to the object side.

Table 4 shows numerical data of the fourth embodiment of the present invention. In Table 4, f is the focal length, FNO is the F-number, 2ω is the field angle, and Bf is the back focus. In addition, the surface number represents the order of lens surfaces from the object side along the direction of propagation of the light beam, and the refractive index and Abbe number represent values for the d-line (λ=587.6 nm).

TABLE 4 f = 31.968 to 41.358 to 48.866
FNO = 7.7 to 8.6 to 9.5
2ω = 70.81° to 54.73° to 46.84°

| Surface number | Radius of curvature | Surface-to-surface distance | Abbe number | Refractive index |
|---|---|---|---|---|
| 1 | −68.4915 | 1.507 | 63.38 | 1.61800 |
| 2 | 37.3001 | (d2 = variable) | | |
| 3* | 31.3519 | 2.512 | 57.57 | 1.49108 (acryl) |
| 4 | −112.6607 | 1.256 | | |
| 5 | ∞ | (d5 = variable) | | (aperture stop S) |
| 6 | 13.9286 | 5.023 | 70.41 | 1.48749 |
| 7 | 94.9568 | 4.735 | | |
| 8* | 43.4515 | 1.633 | 30.24 | 1.58518 (polycarbonate) |
| 9 | 17.2904 | (Bf) | | |

(Aspherical Surface Data)
(3rd surface)

κ = 1.0000          $C_4$ = −4.35909 × $10^{-5}$
$C_6$ = 7.80273 × $10^{-6}$    $C_8$ = −5.37476 × $10^{-7}$
$C_{10}$ = 1.26136 × $10^{-8}$
(8th surface)

κ = 1.0000          $C_4$ = −1.05993 × $10^{-4}$
$C_6$ = 2.31902 × $10^{-7}$    $C_8$ = −1.16653 × $10^{-9}$
$C_{10}$ = 5.84360 × $10^{-11}$ (Variable Distances in Operation for Changing the State of Lens Positions)

| f | 31.970 | 41.358 | 48.866 |
|---|---|---|---|
| d2 | 20.942 | 13.107 | 9.391 |
| d5 | 12.637 | 5.693 | 0.708 |
| Bf | 31.318 | 38.236 | 43.200 |

(Condition Corresponding Values)

1/φb = +32.817
1/φc = −50.233
f3 = +59.340
(1) βa              = 0.168 to −0.032
(2) φb/|φc|         = 1.531
(3) DPN/f3          = 0.080

FIGS. 15A to 17H are graphs showing various aberrations for the d-line (λ=587.6 nm) in the fourth embodiment. FIGS. 15A to 15H are graphs showing various aberrations in the infinite focus state in the maximum wide-angle state (smallest focal length state). FIGS. 16A to 16H are graphs showing various aberrations in the infinite focus state in the intermediate focal length state. FIGS. 17A to 17H are graphs showing various aberrations in the infinite focus state in the maximum telephoto state (largest focal length state).

In these graphs, FNO is the F-number, Y is the image height, and A is the half field angle for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective focal length states.

[Fifth Embodiment]

Figure 18:
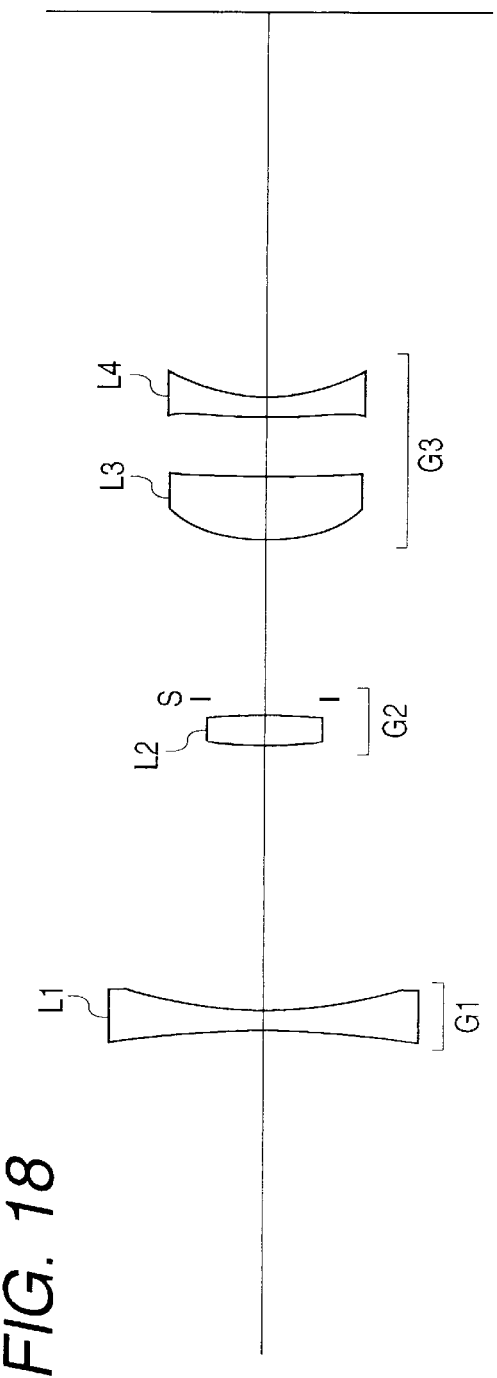
FIG. 18 is a schematic view showing the lens arrangement of a variable focal length optical system according to the fifth embodiment of the present invention.

FIG. 18 is a schematic view showing the lens arrangement of a variable focal length optical system according to the fifth embodiment of the present invention.

The variable focal length optical system shown in FIG. 18 comprises, in succession from the object side, a first lens unit G1 consisting of a biconcave lens L1, a second lens unit G2 consisting of a biconvex lens L2, and a third lens unit G3 consisting of a positive meniscus lens L3 with its convex surface facing the object side and a negative meniscus lens L4 with its convex surface facing the object side.

The third lens unit G3 has the positive meniscus lens L3 as a positive partial lens unit and the negative meniscus lens L4 as a negative partial lens unit.

An aperture stop S is arranged between the second lens unit G2 and the third lens unit G3 and moves integrally with the second lens unit G2 in the operation for changing the state of lens positions from the maximum wide-angle state to the maximum telephoto state.

FIG. 18 shows the positional relationship between the lens units in the maximum wide-angle state. In the operation for changing the state of lens positions to the maximum telephoto state, the first lens unit G1 moves to the image side, the second lens unit G2 is fixed, and the third lens unit G3 moves to the object side.

Table 5 shows numerical data of the fifth embodiment of the present invention. In Table 5, f is the focal length, FNO is the F-number, 2ω is the field angle, and Bf is the back focus. In addition, the surface number represents the order of lens surfaces from the object side along the direction of propagation of the light beam, and the refractive index and Abbe number represent values for the d-line (λ=587.6 nm).

TABLE 5 f = 31.875 to 41.250 to 48.750
FNO = 7.6 to 8.6 to 9.4
2ω = 71.21° to 54.87° to 46.88°

| Surface number | Radius of curvature | Surface-to-surface distance | Abbe number | Refractive index |
|---|---|---|---|---|
| 1 | −65.8088 | 1.500 | 63.38 | 1.61800 |
| 2 | 38.3621 | (d2 = variable) | | |
| 3* | 30.5958 | 2.500 | 57.57 | 1.49108 (acryl) |
| 4 | −129.2749 | 1.250 | | |
| 5 | ∞ | (d5 = variable) | | (aperture stop S) |
| 6 | 13.6223 | 5.000 | 70.41 | 1.48749 |
| 7 | 118.6414 | 4.519 | | |
| 8* | 45.4841 | 1.625 | 30.24 | 1.58518 (polycarbonate) |
| 9 | 16.4576 | (Bf) | | |

(Aspherical Surface Data)
(3rd surface)

κ = 1.0000          $C_4$ = −4.41641 × $10^{-5}$
$C_6$ = 7.80665 × $10^{-6}$    $C_8$ = −5.38821 × $10^{-7}$
$C_{10}$ = 1.27981 × $10^{-8}$

TABLE 5-continued (8th surface)

$\kappa = 1.0000$  $C_4 = -1.08278 \times 10^{-4}$
$C_6 = 9.20355 \times 10^{-8}$  $C_8 = -1.08018 \times 10^{-8}$
$C_{10} = 5.90974 \times 10^{-11}$ (Variable Distances in Operation for Changing the State of Lens Positions)

| f  | 31.875 | 41.250 | 48.750 |
|----|--------|--------|--------|
| d2 | 21.649 | 13.805 | 10.092 |
| d5 | 12.732 | 5.712  | 0.625  |
| Bf | 31.136 | 37.969 | 42.869 |

(Condition Corresponding Values)

$1/\phi b = +31.083$
$1/\phi c = -45.000$
$f3 = +58.735$
(1) $\beta a$ = 0.161 to -0.038
(2) $\phi b/|\phi c|$ = 1.448
(3) DPN/f3 = 0.077

FIGS. 19A to 21H are graphs showing various aberrations for the d-line ($\lambda$=587.6 nm) in the fifth embodiment. FIGS. 19A to 19H are graphs showing various aberrations in the infinite focus state in the maximum wide-angle state (smallest focal length state). FIGS. 20A to 20H are graphs showing various aberrations in the infinite focus state in the intermediate focal length state. FIGS. 21A to 21H are graphs showing various aberrations in the infinite focus state in the maximum telephoto state (largest focal length state).

In these graphs, FNO is the F-number, Y is the image height, and A is the half field angle for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective focal length states.

[Sixth Embodiment]

Figure 22:
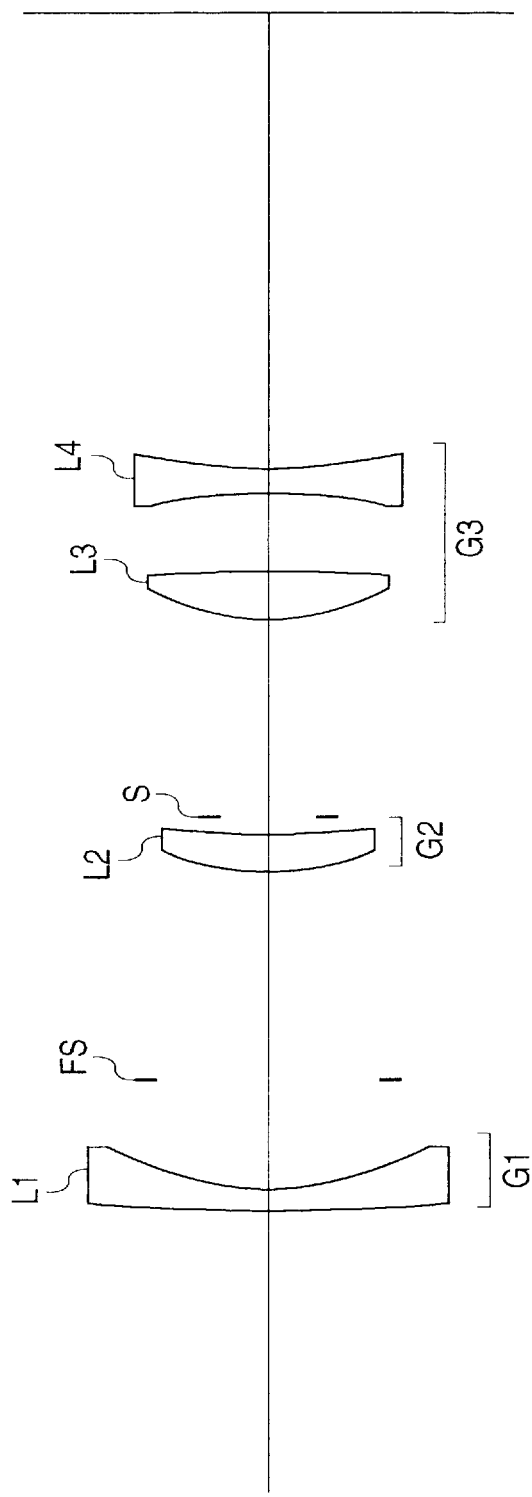
FIG. 22 is a schematic view showing the lens arrangement of a variable focal length optical system according to the sixth embodiment of the present invention.
Figure 1:
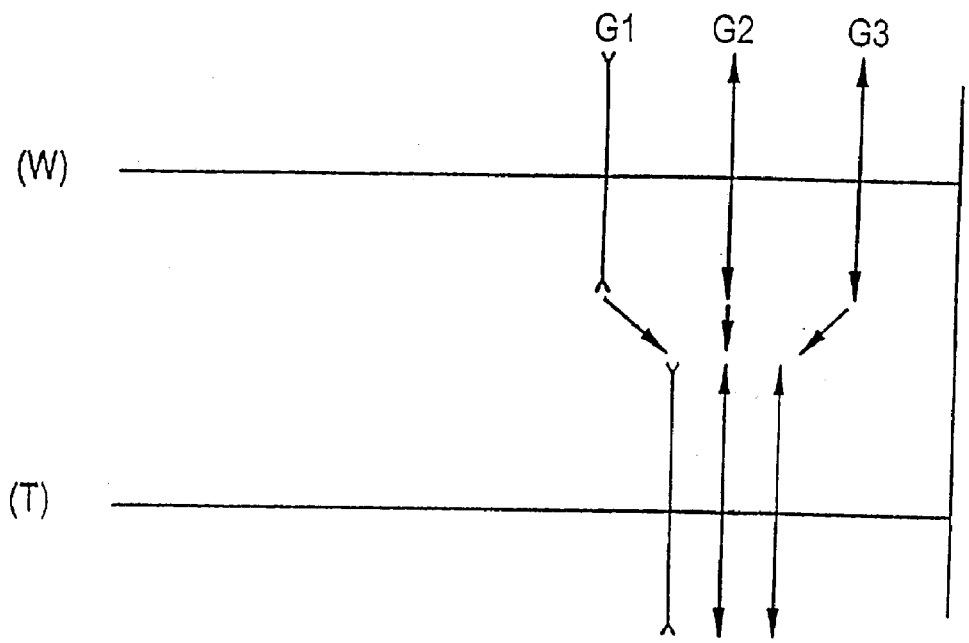
Figure 2:
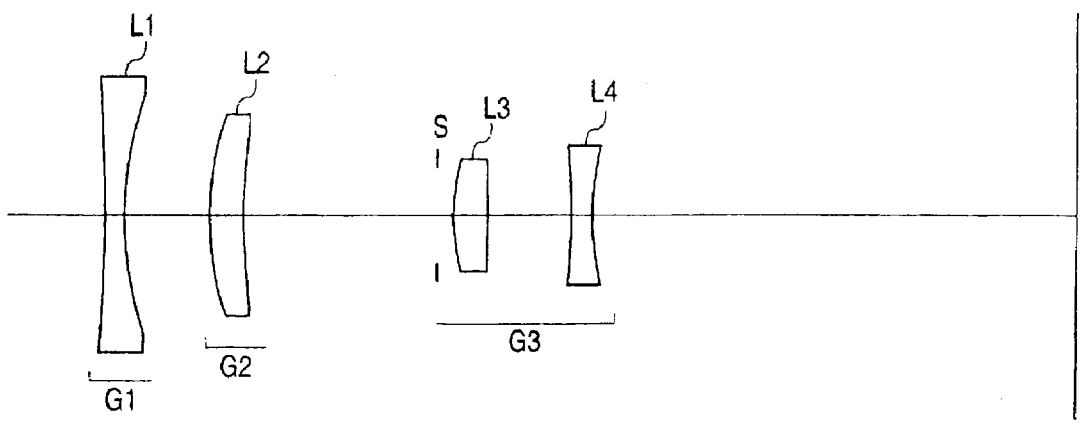

FIG. 22 is a schematic view showing the lens arrangement of a variable focal length optical system according to the sixth embodiment of the present invention.

The variable focal length optical system shown in FIG. 22 comprises, in succession from the object side, a first lens unit G1 consisting of a negative meniscus lens L1 with its convex surface facing the object side, a second lens unit G2 consisting of a positive meniscus lens L2 with its convex surface facing the object side, and a third lens unit G3 consisting of a biconvex lens L3 and a biconcave lens L4.

The third lens unit G3 has the biconvex lens L3 as a positive partial lens unit and the biconcave lens L4 as a negative partial lens unit.

An aperture stop S is arranged between the second lens unit G2 and the third lens unit G3.

FIG. 22 shows the positional relationship between the lens units in the maximum wide-angle state. In the operation for changing the state of lens positions to the maximum telephoto state, the first lens unit G1 is fixed, and the second lens unit G2 and the third lens unit G3 move to the object side such that the air gap therebetween is decreased.

Table 6 shows numerical data of the sixth embodiment of the present invention. In Table 6, f is the focal length, FNO is the F-number, 2ω is the field angle, and Bf is the back focus. In addition, the surface number represents the order of lens surfaces from the object side along the direction of propagation of the light beam, and the refractive index and Abbe number represent values for the d-line ($\lambda$=587.6 nm).

TABLE 6 f = 31.875 to 41.250 to 48.750
FNO = 7.8 to 8.6 to 9.5
2ω = 71.43° to 55.77° to 47.54°

| Surface number | Radius of curvature | Surface-to-surface distance | Abbe number | Refractive index |
|---|---|---|---|---|
| 1 | -124.8390 | 1.500 | 50.84 | 1.65844 |
| 2 | 20.8333 | 7.500 | | |
| 3 | ∞ | (d3 = variable) | | (fixed stop FS) |
| 4* | 17.2590 | 2.500 | 57.57 | 1.49108 (acryl) |
| 5 | 75.0479 | (d5 = variable) | | |
| 6 | ∞ | (d6 = variable) | | (aperture stop S) |
| 7 | 17.4813 | 3.214 | 70.45 | 1.48749 |
| 8 | -105.3704 | 5.281 | | |
| 9* | -73.0714 | 1.625 | 30.24 | 1.58518 (polycarbonate) |
| 10 | 41.0714 | (Bf) | | |

(Aspherical Surface Data)
(4th surface)

$\kappa = 1.0000$  $C_4 = -9.25747 \times 10^{-6}$
$C_6 = -1.69397 \times 10^{-7}$  $C_8 = 1.84503 \times 10^{-9}$
$C_{10} = -6.20878 \times 10^{-12}$ (9th surface)

$\kappa = 1.0000$  $C_4 = -9.10285 \times 10^{-5}$
$C_6 = 4.02260 \times 10^{-7}$  $C_8 = -1.23310 \times 10^{-8}$
$C_{10} = 8.83985 \times 10^{-11}$ (Variable Distances in Operation for Changing the State of Lens Positions)

| f  | 31.875 | 41.250 | 48.750 |
|----|--------|--------|--------|
| d3 | 13.866 | 6.282  | 2.35   |
| d5 | 1.250  | 8.834  | 12.881 |
| d6 | 13.407 | 6.406  | 0.625  |
| Bf | 31.107 | 37.919 | 43.513 |

(Condition Corresponding Values)

$1/\phi b = +31.023$
$1/\phi c = -45.000$
$f3 = +64.104$
(1) $\beta a$ = 0.257 to -0.064
(2) $\phi b/|\phi c|$ = 1.451
(3) DPN/f3 = 0.082

FIGS. 23A to 25H are graphs showing various aberrations for the d-line ($\lambda$=587.6 nm) in the sixth embodiment. FIGS. 23A to 23H are graphs showing various aberrations in the infinite focus state in the maximum wide-angle state (smallest focal length state). FIGS. 24A to 24H are graphs showing various aberrations in the infinite focus state in the intermediate focal length state. FIGS. 25A to 25H are graphs showing various aberrations in the infinite focus state in the maximum telephoto state (largest focal length state).

In these graphs, FNO is the F-number, Y is the image height, and A is the half field angle for each image height.

In each graph showing an astigmatism, a solid curve represents the sagittal image plane, and a broken curve represents the meridional image plane. In addition, in each graph showing a spherical aberration, a broken curve represents the sine condition.

As can be seen from these graphs, in this embodiment, various aberrations are satisfactorily corrected in the respective focal length states.

Having described preferred embodiments of the present invention, it is to be understood that any variations will occur to those skilled in the art within the scope of the appended claims.

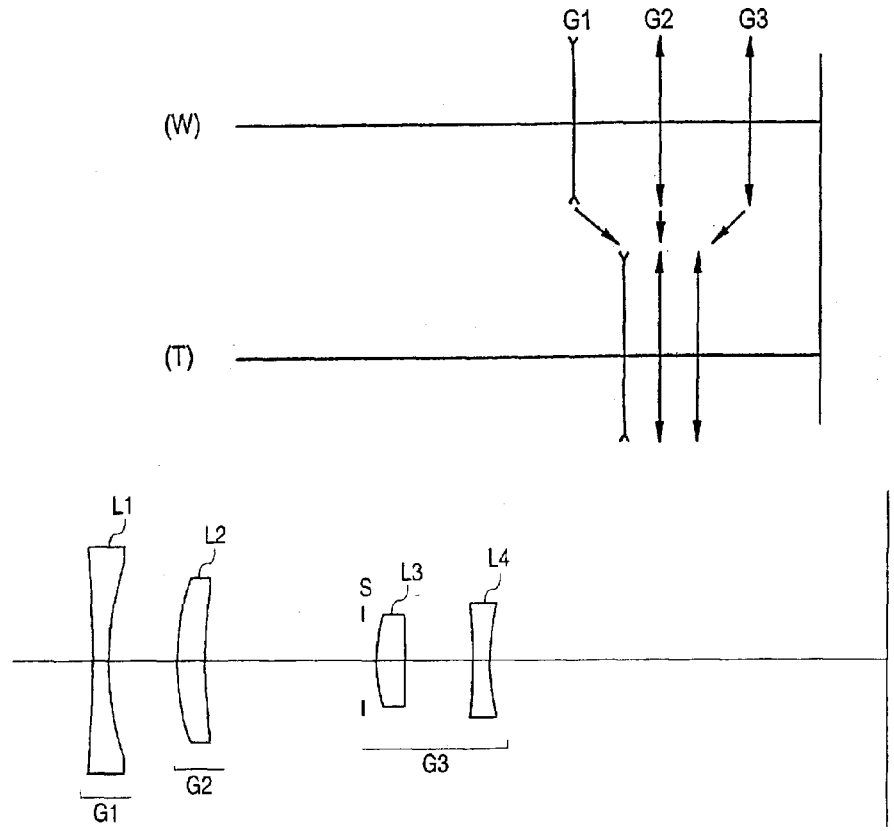

What is claimed is:

1. A variable focal length optical system comprising, in succession from an object side, a first lens unit (G1) having a negative refractive power, a second lens unit (G2) having a positive refractive power, and a third lens unit (G3) having a positive refractive power, wherein said third lens unit (G3) consists of a positive lens component having a positive refractive power and a negative lens component having a negative refractive power and arranged on an image side of said positive lens component, and the following condition is satisfied:

$$0.03 < DPN/f3 < 0.25$$

where DPN is the air gap along an optical axis between said positive lens component and said negative lens component, and f3 is the focal length of said third lens unit (G3).

2. An optical system according to claim 1, wherein at least said second lens unit (G2) and said third lens unit (G3) move toward an object side so as to change an air gap between said second lens unit (G2) and said third lens unit (G3) when the focal length of the optical system changes from the maximum wide-angle state to the maximum telephoto state.

3. An optical system according to claim 2, wherein said first lens unit (G1) is constructed by a negative lens component and said second lens unit (G2) is constructed by a positive lens component.

4. A variable focal length optical system consisting of, in succession from an object side, a first lens component (L1) having a negative refractive power, a second lens component (L2) having a positive refractive power, a third lens component (L3) having a positive refractive power, and a fourth lens component (L4) having a negative refractive power, wherein a first air gap between said first lens component (L1) and said second lens component (L2) decreases, and at least one of a second air gap between said second lens component (L2) and said third lens component (L3), and a third air gap between said third lens component (L3) and said fourth lens component (L4) changes when the focal length of the optical system changes from a maximum wide-angle state to a maximum telephoto state.

5. An optical system according to claim 4, wherein said second lens component (L2) is fixed along an optical axis when the focal length of the optical system changes from the maximum wide-angle state to the maximum telephoto state.

6. An optical system according to claim 4, wherein at least said second lens component (L2), said third lens component (L3), and said fourth lens component (L4) move toward an object side so as to change said second air gap when the focal length of the optical system changes from the maximum wide-angle state to the maximum telephoto state.

7. An optical system according to claim 6, wherein said second air gap decreases when the focal length of the optical system is changed while said third lens component (L3) and said fourth lens component (L4) integrally move.

8. An optical system according to claim 7, wherein said first lens component (L1) moves to an image side when the focal length of the optical system changes from the maximum wide-angle state to the maximum telephoto state.

9. A variable focal length optical system comprising two positive lens units and one negative lens unit, one of said positive lens units being arranged to be closest to an image, a first air gap between first adjacent two of said lens units being variable, and a second air gap between second adjacent two of said lens units being variable, wherein said one of said positive lens units consists of a positive lens component having a positive refractive power and a negative lens component having a negative refractive power and arranged on the image side of said positive lens component, and a lateral magnification ($\beta a$) of said one of said positive lens units in a maximum wide-angle state satisfies the following condition:

$$-1.5 < \beta a < 0.5.$$

10. An optical system according to claim 9, wherein said negative lens unit is arranged to be closest to an object and consists of a negative lens component.

11. An optical system according to claim 10, wherein said optical system is constructed by four lens component.

12. An optical system according to claim 10, wherein the following condition is satisfied:

$$1.1 < \phi b / |\phi c| < 1.9$$

where $\phi b$ is the refractive power of said positive lens component, and $\phi c$ is the refractive power of said negative lens component of said one of said positive lens units.

* * * * *

UNITED STATES PATENT AND TRADEMARK OFFICE
CERTIFICATE OF CORRECTION

PATENT NO.    : 5,835,287
DATED         : November 10, 1998
INVENTOR(S)   : Ohtake It is certified that error appears in the above-identified patent and that said Letters Patent is hereby corrected as shown below:

Title page,
Showing an illustrative figure, should be deleted and substitute therefor the attached title page.

Drawings,
Delete drawing sheet 1, and substitute therefor the drawing sheet, consisting of figures 1 & 2 as shown on attached page.

Signed and Sealed this

Ninth Day of July, 2002

Attest:

JAMES E. ROGAN
Attesting Officer    Director of the United States Patent and Trademark Office

United States Patent [19]
Ohtake

[11] Patent Number: 5,835,287
[45] Date of Patent: Nov. 10, 1998

[54] VARIABLE FOCAL LENGTH OPTICAL SYSTEM

[75] Inventor: Motoyuki Ohtake, Kawasaki, Japan

[73] Assignee: Nikon Corporation, Tokyo, Japan

[21] Appl. No.: 713,857

[22] Filed: Sep. 12, 1996

[30] Foreign Application Priority Data

Nov. 24, 1995 [JP] Japan .................. 7-329865

[51] Int. Cl.⁶ .................. G02B 9/58; G02B 9/34
[52] U.S. Cl. .................. 359/782; 359/781
[58] Field of Search .................. 359/686, 689, 359/691, 694, 695, 747, 748, 753, 771, 776, 778, 781, 782, 784, 793

[56] References Cited

U.S. PATENT DOCUMENTS

| | | | |
|---|---|---|---|
| 4,787,718 | 11/1988 | Cho | 359/686 |
| 4,856,880 | 8/1989 | Ohshita | 359/753 |
| 5,111,338 | 5/1992 | Nakayama | 359/686 |
| 5,270,865 | 12/1993 | Kikuchi et al. | 359/686 |
| 5,283,693 | 2/1994 | Kohno et al. | 359/691 |
| 5,381,269 | 1/1995 | Estelle | 359/691 |
| 5,406,416 | 4/1995 | Ohtake | 359/686 |
| 5,483,380 | 1/1996 | Nozawa | 359/686 |
| 5,519,540 | 5/1996 | Suzuki | 359/771 |
| 5,523,888 | 6/1996 | Nishio | 359/686 |

*Primary Examiner*—Frank G. Font
*Assistant Examiner*—Michael P. Stafira
*Attorney, Agent, or Firm*—Shapiro and Shapiro

[57] ABSTRACT

A variable focal length optical system includes, in succession from an object side, a first lens component, a second lens component, a third lens component, and a fourth lens component, wherein at least two air gaps of a first air gap between the first lens component and the second lens component, a second air gap between the second lens component and the third lens component, and a third air gap between the third lens component and the fourth lens component change when the focal length of the zoom lens is changed.

12 Claims, 22 Drawing Sheets